US012721769B2

(12) United States Patent
Fowler et al.

(10) Patent No.: US 12,721,769 B2
(45) Date of Patent: Sep. 1, 2026

(54) APPARATUS AND SYSTEM FOR TURNING AND POSITIONING A PATIENT

(71) Applicant: Sage Products, LLC, Cary, IL (US)

(72) Inventors: Paul M. Fowler, Rockford, IL (US); Craig S. Golden, Arlington Heights, IL (US)

(73) Assignee: SAGE PRODUCTS, LLC, Cary, IL (US)

( * ) Notice: Subject to any disclaimer, the term of this patent is extended or adjusted under 35 U.S.C. 154(b) by 0 days.

(21) Appl. No.: 19/286,955

(22) Filed: Jul. 31, 2025

(65) Prior Publication Data

US 2025/0352415 A1 Nov. 20, 2025

Related U.S. Application Data

(62) Division of application No. 17/567,683, filed on Jan. 3, 2022, now Pat. No. 12,390,383, which is a division of application No. 15/635,493, filed on Jun. 28, 2017, now Pat. No. 11,213,447, which is a division of (Continued)

(51) Int. Cl.

| | |
|---|---|
| ***A61G 7/10*** | (2006.01) |
| ***A61G 7/00*** | (2006.01) |
| ***A61G 7/057*** | (2006.01) |

(52) U.S. Cl.

CPC ........... *A61G 7/1026* (2013.01); *A61G 7/001* (2013.01); *A61G 7/057* (2013.01); *A61G 7/1073* (2013.01)

(58) Field of Classification Search

None

See application file for complete search history.

(56) References Cited

U.S. PATENT DOCUMENTS

| | | | |
|---|---|---|---|
| 542,720 | A | 7/1895 | Weiss |
| 674,451 | A | 5/1901 | Bunker |
| 1,334,901 | A | 3/1920 | Higdon |

(Continued)

FOREIGN PATENT DOCUMENTS

| | | | |
|---|---|---|---|
| AU | 2008256995 A1 | 12/2008 | |
| CN | 108741913 A | 11/2018 | |

(Continued)

OTHER PUBLICATIONS

"Boost" Definition in the Cambridge English Dictionary, Non-Final Office Action mailed on May 11, 2021, for U.S. Appl. No. 16/547,343.

(Continued)

*Primary Examiner* — Adam C Ortiz

(74) *Attorney, Agent, or Firm* — Foley & Lardner LLP

(57) ABSTRACT

A system for use with a bed having a frame and a supporting surface includes a sheet having a bottom surface configured to be placed above the supporting surface and a top surface opposite the bottom surface, and a wedge having a wedge body with a base wall, a ramp surface, and a back wall, wherein the base wall has a base engagement member configured to engage a surface of the bed to form a selective gliding assembly that resists movement of the wedge with respect to the bed in a direction extending from the back wall toward the apex, and wherein the base engagement member is configured as a patch, the patch covering only a first portion of the base wall such that edges of the engagement members are spaced from edges of the base wall to allow a second portion of the base wall to be exposed.

20 Claims, 12 Drawing Sheets

Related U.S. Application Data application No. 14/555,199, filed on Nov. 26, 2014, now Pat. No. 9,693,920.

(60) Provisional application No. 61/909,654, filed on Nov. 27, 2013.

(56) References Cited

U.S. PATENT DOCUMENTS

| | | | |
|---|---|---|---|
| 1,726,939 | A | 9/1929 | Anderson |
| 2,068,134 | A | 1/1937 | Houghton |
| 2,573,375 | A | 10/1951 | Winstead |
| 2,582,439 | A | 1/1952 | Kavanagh |
| 2,750,606 | A | 6/1956 | Freedlander et al. |
| 2,804,911 | A | 9/1957 | Howarth |
| D195,020 | S | 4/1963 | Emery |
| 3,112,956 | A | 12/1963 | Shick et al. |
| 3,155,991 | A | 11/1964 | Dunham |
| 3,166,799 | A | 1/1965 | Milton |
| 3,178,732 | A | 4/1965 | Stibitz |
| 3,205,010 | A | 9/1965 | Schick |
| 3,325,832 | A | 6/1967 | Malicki |
| 3,333,286 | A | 8/1967 | Biolik |
| 3,452,372 | A | 7/1969 | Emery |
| 3,474,781 | A | 10/1969 | Gaylord, Jr. |
| 3,477,071 | A | 11/1969 | Emerson |
| 3,503,649 | A | 3/1970 | Johnson |
| 3,523,563 | A | 8/1970 | Louis |
| 3,536,117 | A | 10/1970 | Huber |
| 3,653,083 | A | 4/1972 | Lapidus |
| 3,778,851 | A | 12/1973 | Howorth |
| 3,785,395 | A | 1/1974 | Andreasson |
| 3,811,140 | A | 5/1974 | Burpo |
| 3,829,914 | A | 8/1974 | Treat |
| 3,933,154 | A | 1/1976 | Cabansag |
| 3,965,503 | A | 6/1976 | Gridel |
| 4,030,719 | A | 6/1977 | Gabriele et al. |
| 4,048,681 | A | 9/1977 | Baulch et al. |
| 4,066,072 | A | 1/1978 | Cummins |
| 4,073,021 | A | 2/1978 | Carlisle |
| 4,108,170 | A | 8/1978 | Spann |
| 4,132,228 | A | 1/1979 | Green |
| 4,214,326 | A | 7/1980 | Spann |
| 4,233,700 | A | 11/1980 | Spann |
| 4,247,963 | A | 2/1981 | Reddi |
| 4,272,856 | A | 6/1981 | Wegener et al. |
| 4,370,769 | A | 2/1983 | Herzig et al. |
| 4,389,742 | A | 6/1983 | Dewitt |
| 4,391,010 | A | 7/1983 | Kronman |
| 4,417,710 | A | 11/1983 | Adair |
| 4,425,676 | A | 1/1984 | Crane |
| 4,509,214 | A | 4/1985 | Shea |
| 4,517,690 | A | 5/1985 | Wegener |
| 4,528,704 | A | 7/1985 | Wegener et al. |
| 4,554,693 | A | 11/1985 | Calloway |
| 4,627,426 | A | 12/1986 | Wegener et al. |
| 4,627,796 | A | 12/1986 | Moore |
| 4,662,016 | A | 5/1987 | Seeman |
| 4,662,366 | A | 5/1987 | Tari |
| 4,675,925 | A | 6/1987 | Littleton |
| 4,686,719 | A | 8/1987 | Johnson et al. |
| 4,694,515 | A | 9/1987 | Rogers, Jr. |
| 4,802,249 | A | 2/1989 | Bills |
| 4,809,484 | A | 3/1989 | Lovik |
| 4,823,417 | A | 4/1989 | Fukuichi |
| 4,858,625 | A | 8/1989 | Cramer |
| 4,867,230 | A | 9/1989 | Voss |
| D305,458 | S | 1/1990 | Wang |
| 4,905,712 | A | 3/1990 | Bowlin et al. |
| 4,908,895 | A | 3/1990 | Walker |
| 4,912,861 | A | 4/1990 | Huang |
| 4,944,053 | A | 7/1990 | Smith |
| 4,977,629 | A | 12/1990 | Jones |
| 5,012,821 | A | 5/1991 | Tarver |
| 5,016,650 | A | 5/1991 | Marlar |
| 5,022,110 | A | 6/1991 | Stroh |
| 5,056,533 | A | 10/1991 | Solano |
| 5,060,324 | A | 10/1991 | Marinberg et al. |
| 5,067,189 | A | 11/1991 | Weedling et al. |
| 5,070,559 | A | 12/1991 | Pettifer |
| 5,086,543 | A | 2/1992 | Mitchell |
| 5,088,747 | A | 2/1992 | Morrison et al. |
| 5,103,518 | A | 4/1992 | Gilroy et al. |
| 5,111,838 | A | 5/1992 | Langston |
| 5,123,699 | A | 6/1992 | Warburton |
| 5,138,731 | A | 8/1992 | Harcrow, Jr. |
| 5,142,720 | A | 9/1992 | Kelso et al. |
| 5,144,708 | A | 9/1992 | Pekar |
| 5,148,563 | A | 9/1992 | Klearman et al. |
| D331,270 | S | 11/1992 | Johnson et al. |
| 5,168,589 | A | 12/1992 | Stroh et al. |
| 5,182,828 | A | 2/1993 | Alivizatos |
| 5,193,238 | A | 3/1993 | Clute |
| 5,199,121 | A | 4/1993 | Payne |
| 5,226,186 | A | 7/1993 | Boyd |
| 5,280,657 | A | 1/1994 | Stagg |
| 5,329,655 | A | 7/1994 | Garner |
| 5,331,698 | A | 7/1994 | Newkirk et al. |
| 5,362,302 | A | 11/1994 | Jensen et al. |
| 5,369,829 | A | 12/1994 | Jay |
| 5,373,595 | A | 12/1994 | Johnson et al. |
| 5,390,384 | A | 2/1995 | Dinsmoor et al. |
| 5,395,162 | A | 3/1995 | Jay et al. |
| 5,398,678 | A | 3/1995 | Gamow |
| 5,426,801 | A | 6/1995 | Klearman et al. |
| 5,438,721 | A | 8/1995 | Pahno et al. |
| 5,447,235 | A | 9/1995 | Pharo |
| 5,448,790 | A | 9/1995 | Saro et al. |
| 5,451,179 | A | 9/1995 | Laroi, Jr. et al. |
| 5,452,487 | A | 9/1995 | Leggett |
| D369,054 | S | 4/1996 | Straub et al. |
| D369,934 | S | 5/1996 | Straub et al. |
| 5,524,307 | A | 6/1996 | Griffin |
| RE35,299 | E | 7/1996 | Weedling et al. |
| 5,549,121 | A | 8/1996 | Vinci |
| 5,561,873 | A | 10/1996 | Weedling |
| 5,603,591 | A | 2/1997 | Mclellan |
| RE35,468 | E | 3/1997 | Newman |
| 5,632,769 | A | 5/1997 | Kappel et al. |
| 5,634,224 | A | 6/1997 | Stephen |
| 5,671,977 | A | 9/1997 | Jay et al. |
| D385,143 | S | 10/1997 | Straub et al. |
| 5,702,153 | A | 12/1997 | Pliska |
| 5,742,958 | A | 4/1998 | Solazzo |
| 5,797,155 | A | 8/1998 | Maier et al. |
| 5,806,928 | A | 9/1998 | Gattuso et al. |
| 5,830,780 | A | 11/1998 | Dennison et al. |
| 5,836,027 | A | 11/1998 | Leventhal et al. |
| 5,836,654 | A | 11/1998 | Debellis et al. |
| 5,957,491 | A | 9/1999 | Cech et al. |
| 5,997,491 | A | 12/1999 | Harris |
| 6,009,873 | A | 1/2000 | Neviaser |
| 6,012,183 | A | 1/2000 | Brooke et al. |
| 6,073,291 | A | 6/2000 | Davis |
| 6,082,824 | A | 7/2000 | Chow |
| 6,102,936 | A | 8/2000 | Augustine et al. |
| 6,108,861 | A | 8/2000 | Vystrcil et al. |
| 6,115,861 | A | 9/2000 | Reeder et al. |
| 6,145,143 | A | 11/2000 | Hicks et al. |
| 6,154,900 | A | 12/2000 | Shaw |
| 6,159,172 | A | 12/2000 | Gray et al. |
| 6,223,368 | B1 | 5/2001 | Anslin |
| 6,223,369 | B1 | 5/2001 | Maier et al. |
| 6,240,584 | B1 | 6/2001 | Perez et al. |
| 6,241,320 | B1 | 6/2001 | Chew et al. |
| 6,241,755 | B1 | 6/2001 | Arnold et al. |
| 6,273,810 | B1 | 8/2001 | Rhodes et al. |
| 6,289,534 | B1 | 9/2001 | Hakamiun et al. |
| 6,317,909 | B1 | 11/2001 | Blum |
| 6,327,724 | B1 | 12/2001 | Sharrock et al. |
| 6,347,642 | B1 | 2/2002 | Schulte |
| 6,357,084 | B1 | 3/2002 | Haidon |
| 6,367,106 | B1 | 4/2002 | Gronsman |
| 6,374,435 | B1 | 4/2002 | Leininger et al. |
| 6,413,194 | B1 | 7/2002 | Gant |

(56) References Cited

U.S. PATENT DOCUMENTS 6,427,268 B1 8/2002 Davis
6,467,106 B1 10/2002 Heimbrock
6,484,334 B1 11/2002 Borders et al.
6,510,574 B2 1/2003 Sharrock et al.
6,541,094 B1 4/2003 Landvik et al.
6,543,068 B1 4/2003 Penninger
6,560,793 B2 5/2003 Walker
6,653,363 B1 11/2003 Tursi et al.
6,658,676 B1 12/2003 Persson et al.
6,666,426 B1 12/2003 Taylor
6,698,041 B2 3/2004 Vansteenburg et al.
6,701,544 B2 3/2004 Heimbrock
6,701,558 B2 3/2004 Vansteenburg
6,701,559 B2 3/2004 Boso et al.
6,804,845 B2 10/2004 Stewart et al.
6,820,292 B2 11/2004 Heimbrock
6,874,176 B2 4/2005 Berge
6,898,809 B2 5/2005 Davis
D508,182 S 8/2005 Colonello
D509,270 S 9/2005 Jason
6,964,073 B1 11/2005 Curry
6,966,275 B2 11/2005 Whitehill
7,028,350 B1 4/2006 Davis
7,032,261 B2 4/2006 Heimbrock
7,040,706 B2 5/2006 Koffler
7,074,166 B2 7/2006 Weitzman
7,107,641 B2 9/2006 Davis
7,114,204 B2 10/2006 Patrick
7,131,154 B2 11/2006 Davis et al.
7,168,115 B2 1/2007 Davis
7,210,176 B2 5/2007 Weedling et al.
7,225,486 B2 6/2007 Jackson
7,240,384 B2 7/2007 Dudonis
7,243,382 B2 7/2007 Weedling et al.
7,266,852 B2 9/2007 Davis
D555,248 S 11/2007 Rugfelt
7,337,485 B2 3/2008 Metzger
7,340,785 B2 3/2008 Weedling et al.
7,373,680 B2 5/2008 Davis
7,376,995 B2 5/2008 Davis
7,406,723 B2 8/2008 Davis
7,415,738 B2 8/2008 Weedling et al.
7,467,431 B2 12/2008 Weedling et al.
7,506,387 B1 3/2009 Scordato et al.
7,565,709 B2 7/2009 Davis
7,571,498 B2 8/2009 Jewell et al.
7,574,761 B2 8/2009 Davis
7,591,029 B2 9/2009 Weedling et al.
7,627,910 B2 12/2009 Davis
7,650,654 B2 1/2010 Lambarth et al.
7,676,862 B2 3/2010 Poulos et al.
7,681,262 B2 3/2010 Weedling et al.
D613,105 S 4/2010 Chuang
7,712,170 B2 5/2010 Davis
7,731,282 B2 6/2010 Leeds
7,731,283 B2 6/2010 Leeds
7,735,164 B1 6/2010 Patrick
7,739,758 B2 6/2010 Weedling et al.
7,757,318 B2 7/2010 Poulos et al.
7,784,132 B2 8/2010 Gonzalez et al.
7,810,193 B1 10/2010 Ennis et al.
7,900,299 B2 3/2011 Weedling et al.
7,914,081 B1 3/2011 Smith
7,914,611 B2 3/2011 Vrzalik et al.
7,954,187 B1 6/2011 Earnest
8,001,635 B2 8/2011 Humbles
8,118,920 B2 2/2012 Vrzalik
8,127,382 B1 3/2012 Plascencia et al.
8,128,065 B2 3/2012 King et al.
8,161,583 B1 4/2012 Palen
D663,428 S 7/2012 Gã-Ransson et al.
8,214,951 B1 7/2012 Batta
8,234,727 B2 8/2012 Schreiber et al.
8,276,222 B1 10/2012 Patrick
8,302,222 B2 11/2012 Jasani
8,353,069 B1 1/2013 Miller
8,372,182 B2 2/2013 Vrzalik et al.
8,387,177 B2 3/2013 Davis
8,413,277 B2 4/2013 Davis et al.
8,464,376 B1 6/2013 Waite
8,464,720 B1 6/2013 Pigazzi et al.
8,511,314 B2 8/2013 Pigazzi et al.
8,539,621 B2 9/2013 West
8,539,622 B2 9/2013 West
8,539,623 B2 9/2013 West
8,566,977 B2 10/2013 Davis
8,590,574 B2 11/2013 Jian et al.
8,601,623 B1 12/2013 West
8,602,032 B2 12/2013 Goldsmith
8,661,580 B2 3/2014 Giap
8,678,418 B1 3/2014 Quarles
8,782,830 B2 7/2014 Brykalski et al.
8,789,533 B2 7/2014 Steffens et al.
D712,555 S 9/2014 Berg
8,850,634 B2 10/2014 Ponsi et al.
8,918,930 B2 12/2014 Stroh et al.
8,978,184 B1 3/2015 Garrett
9,132,052 B2 9/2015 Fowler et al.
9,161,876 B2 10/2015 Pigazzi et al.
9,254,231 B2 2/2016 Vrzalik et al.
9,271,588 B1 3/2016 Phillips et al.
9,308,122 B2 4/2016 Dunlop
9,321,392 B1 4/2016 Lebrun
9,326,903 B2 5/2016 Locke
9,332,850 B2 5/2016 Krishtul
9,375,343 B2 6/2016 Marshall et al.
D767,148 S 9/2016 Perreault
9,522,078 B2 12/2016 Pizzini
9,538,853 B2 1/2017 Vrzalik et al.
9,554,956 B2 1/2017 Reiners et al.
D781,615 S 3/2017 Parman
9,675,509 B2 6/2017 Tilk et al.
9,693,919 B2 7/2017 Berman
9,693,920 B2 7/2017 Fowler et al.
9,750,656 B1 9/2017 Pigazzi et al.
9,782,287 B2 10/2017 Pigazzi et al.
9,782,312 B2 10/2017 Brubaker et al.
9,782,313 B2 10/2017 Hindson
9,795,529 B2 10/2017 Lehtio
D802,223 S 11/2017 Quantz
9,835,344 B2 12/2017 Vrzalik et al.
9,849,053 B2 12/2017 Rigoni et al.
D808,686 S 1/2018 May et al.
9,907,408 B2 3/2018 Vrzalik et al.
9,931,262 B2 4/2018 Pigazzi et al.
9,949,883 B1 4/2018 Pigazzi et al.
9,962,122 B2 5/2018 Augustine et al.
9,968,500 B1 5/2018 Amini et al.
10,016,066 B2 7/2018 Howard
10,034,808 B2 7/2018 Vrzalik et al.
10,039,680 B2 8/2018 Galbraith
10,045,902 B1 8/2018 Pigazzi et al.
10,064,770 B2 9/2018 Reiners et al.
10,092,470 B2 10/2018 Lewis
10,098,800 B2 10/2018 Pigazzi et al.
10,112,513 B2 10/2018 Patrick et al.
10,159,533 B2 12/2018 Moll et al.
10,172,470 B1 1/2019 Vrzalik et al.
10,206,830 B2 2/2019 Fowler et al.
10,285,888 B2 5/2019 Liu
10,285,890 B1 5/2019 Pigazzi et al.
10,314,417 B2 6/2019 Duck
10,322,050 B1 6/2019 Pigazzi et al.
10,363,185 B2 7/2019 Purdy et al.
10,363,188 B2 7/2019 Young
10,376,430 B2 8/2019 Liu
10,398,614 B2 9/2019 Rigoni et al.
10,500,115 B2 12/2019 Weedling
10,512,578 B2 12/2019 Visco
10,561,522 B2 2/2020 Giap
10,568,435 B2 2/2020 Luckemeyer et al.
10,576,004 B1 3/2020 Frances
10,588,800 B2 3/2020 Fletcher et al.
10,709,626 B1 7/2020 Gomez

(56) References Cited

U.S. PATENT DOCUMENTS 10,716,724 B2 7/2020 Vrzalik et al.
D897,132 S 9/2020 Mckinney
10,765,576 B2 9/2020 Rigoni et al.
10,765,580 B1 9/2020 Augustine
10,772,778 B2 9/2020 Hahn et al.
10,828,216 B2 11/2020 Phalen et al.
D907,777 S 1/2021 Hahn et al.
10,912,699 B2 2/2021 Pigazzi et al.
10,993,866 B2 5/2021 Augustine
11,020,301 B2 6/2021 Messerschmidt
11,224,548 B2 1/2022 Depauw
11,224,550 B1 1/2022 Gomez
11,266,525 B2 3/2022 Kaforey et al.
11,298,282 B2 4/2022 Davis et al.
11,324,650 B2 5/2022 Zhou et al.
11,364,166 B2 6/2022 Grindstaff et al.
11,439,551 B2 9/2022 Davis et al.
11,471,317 B1 10/2022 Spears
11,484,431 B2 11/2022 Allen
11,484,456 B2 11/2022 Pigazzi et al.
11,510,836 B2 11/2022 Cole et al.
11,607,358 B2 3/2023 Spahn et al.
11,638,670 B1 5/2023 Volz et al.
11,642,267 B2 5/2023 Kea et al.
11,654,068 B2 5/2023 Giap
11,661,129 B2 5/2023 Chambers et al.
11,701,281 B2 7/2023 Meah
11,737,939 B2 8/2023 Davis et al.
D1,005,738 S 11/2023 Fan
11,833,091 B2 12/2023 Vrzalik et al.
11,890,240 B2 2/2024 Ponsi et al.
D1,033,986 S 7/2024 Pinter
D1,035,318 S 7/2024 De Grasse et al.
12,208,044 B2 1/2025 Kurt et al.
12,533,276 B2 1/2026 Fox et al.
2001/0013146 A1 8/2001 Wempe
2001/0040402 A1 11/2001 Odderson
2002/0029417 A1 3/2002 Walker
2002/0108179 A1 8/2002 Kiser
2002/0109381 A1 8/2002 Duncan
2002/0112286 A1 8/2002 Upton et al.
2002/0133877 A1 9/2002 Kuiper et al.
2002/0148045 A1 10/2002 Giori et al.
2002/0148474 A1 10/2002 Larson
2003/0009952 A1 1/2003 Gallant et al.
2003/0014821 A1 1/2003 Boyd
2003/0030319 A1 2/2003 Clapper
2003/0041379 A1 3/2003 Habboub et al.
2003/0061663 A1 4/2003 Lampel
2003/0066134 A1 4/2003 Chapman
2003/0159212 A1 8/2003 Patrick et al.
2003/0205920 A1 11/2003 Sprouse et al.
2004/0083550 A1 5/2004 Graebe, Jr.
2004/0123382 A1 7/2004 Berge
2004/0237203 A1 12/2004 Romano et al.
2005/0005358 A1 1/2005 Dudonis
2005/0028273 A1 2/2005 Weedling et al.
2005/0034242 A1 2/2005 Davis
2005/0055768 A1 3/2005 Assink
2005/0076437 A1 4/2005 Johnson
2005/0091749 A1 5/2005 Humbles
2005/0102750 A1 5/2005 Berge
2005/0151410 A1 7/2005 Sprouse
2005/0210595 A1 9/2005 Di Stasio et al.
2005/0229314 A1 10/2005 Chisari
2005/0235423 A1 10/2005 Hetzel et al.
2006/0000016 A1 1/2006 Weedling et al.
2006/0037142 A1 2/2006 Binder
2006/0072347 A1 4/2006 Ferraro
2006/0162086 A1 7/2006 Davis
2006/0213010 A1 9/2006 Davis
2007/0006388 A1 1/2007 Townsend
2007/0072690 A1 3/2007 Berenson et al.
2007/0074760 A1 4/2007 Wu
2007/0118993 A1 5/2007 Bates
2007/0266494 A1 11/2007 Deluca et al.
2007/0283498 A1 12/2007 Shelby
2008/0022461 A1 1/2008 Bartlett et al.
2008/0028516 A1 2/2008 Morishima
2008/0029940 A1 2/2008 Kammer et al.
2008/0078033 A1 4/2008 Wyatt et al.
2008/0209630 A1 9/2008 Kazala et al.
2008/0216231 A1 9/2008 Lambarth et al.
2008/0289102 A1 11/2008 Davis
2009/0000037 A1 1/2009 Graebe, Jr.
2009/0211168 A1 8/2009 Bogar
2009/0265857 A1 10/2009 Habegger
2009/0295203 A1 12/2009 Lewis et al.
2010/0257703 A1 10/2010 Vass
2010/0263127 A1 10/2010 Jamshidi
2010/0290931 A1 11/2010 Sanders et al.
2011/0035880 A1 2/2011 Cole et al.
2011/0056017 A1 3/2011 Schreiber et al.
2011/0068939 A1 3/2011 Lachenbruch
2011/0072579 A1 3/2011 Receveur et al.
2011/0219546 A1 9/2011 West
2011/0247725 A1 10/2011 Frayne et al.
2011/0271444 A1 11/2011 Davis
2011/0277234 A1 11/2011 Jasani
2011/0296609 A1 12/2011 Giap
2011/0304186 A1 12/2011 Andrews
2012/0009844 A1 1/2012 Waters et al.
2012/0073053 A1 3/2012 Turner et al.
2012/0085430 A1 4/2012 Johansson et al.
2012/0124752 A1 5/2012 Patrick
2012/0131746 A1 5/2012 Griffin et al.
2012/0144594 A1 6/2012 Nash
2012/0186012 A1 7/2012 Ponsi et al.
2012/0186013 A1 7/2012 Ponsi
2012/0186587 A1 7/2012 Steffens et al.
2012/0210511 A1 8/2012 Davis
2012/0245500 A1 9/2012 Polliack et al.
2012/0255124 A1 10/2012 West
2012/0292958 A1 11/2012 Sprouse, II
2012/0304384 A1 12/2012 Scholz et al.
2012/0311783 A1 12/2012 Chiang et al.
2013/0019882 A1 1/2013 Durham et al.
2013/0042409 A1 2/2013 Gil Gomez et al.
2013/0042414 A1 2/2013 Schreiber et al.
2013/0104907 A1 5/2013 Giap
2013/0145549 A1 6/2013 Piegdon et al.
2013/0152304 A1 6/2013 Dovervik et al.
2013/0152950 A1 6/2013 Giap
2013/0205495 A1 8/2013 Ponsi et al.
2013/0232693 A1 9/2013 Myers
2013/0263377 A1 10/2013 Wootten
2013/0269111 A1 10/2013 Berg
2013/0270881 A1 10/2013 Fowler et al.
2013/0318723 A1 12/2013 Li
2013/0320746 A1 12/2013 Amirault et al.
2013/0340772 A1 12/2013 Carlson et al.
2014/0007351 A1 1/2014 Cohen
2014/0082836 A1 3/2014 Patrick et al.
2014/0250601 A1 9/2014 Gomez
2014/0277307 A1 9/2014 Gammons et al.
2014/0283305 A1 9/2014 Zysman
2014/0304918 A1 10/2014 Steffens et al.
2014/0338121 A1 11/2014 Giap
2014/0352072 A1 12/2014 Holladay
2015/0040326 A1 2/2015 Fairburn et al.
2015/0101126 A1 4/2015 Reiners et al.
2015/0113735 A1 4/2015 Anderson et al.
2015/0122266 A1 5/2015 Saunders et al.
2015/0143628 A1 5/2015 Fowler et al.
2015/0189996 A1 7/2015 Scarlett et al.
2015/0224217 A1 8/2015 Rogers
2015/0225097 A1 8/2015 Anastasia
2015/0238378 A1 8/2015 Bhat et al.
2015/0289817 A1 10/2015 Augustine et al.
2015/0290027 A1 10/2015 Augustine et al.
2015/0290062 A1 10/2015 Augustine et al.
2015/0335165 A1 11/2015 Creekmuir et al.
2015/0369384 A1 12/2015 Frayne
2016/0095777 A1 4/2016 Berman

(56) References Cited

U.S. PATENT DOCUMENTS

| | | | |
|---|---|---|---|
| 2016/0213179 | A1 | 7/2016 | Beckman |
| 2016/0228281 | A1 | 8/2016 | Marshall et al. |
| 2016/0245439 | A1 | 8/2016 | Fry |
| 2016/0279007 | A1 | 9/2016 | Flatt |
| 2017/0049646 | A1 | 2/2017 | Rigoni et al. |
| 2017/0049647 | A1 | 2/2017 | Rigoni et al. |
| 2017/0065473 | A1 | 3/2017 | Scott |
| 2017/0112655 | A1 | 4/2017 | Giap |
| 2017/0119608 | A1 | 5/2017 | Rigoni et al. |
| 2017/0216117 | A1 | 8/2017 | Rigoni et al. |
| 2017/0231410 | A1 | 8/2017 | Chon et al. |
| 2017/0239118 | A1 | 8/2017 | Cole et al. |
| 2017/0326011 | A1 | 11/2017 | Alvarez et al. |
| 2018/0017177 | A1 | 1/2018 | Marson et al. |
| 2018/0104125 | A1 | 4/2018 | Vahala et al. |
| 2018/0140457 | A1 | 5/2018 | Sarma |
| 2018/0192960 | A1 | 7/2018 | Augustine et al. |
| 2018/0200130 | A1 | 7/2018 | Liu |
| 2018/0221229 | A1 | 8/2018 | Kaiser et al. |
| 2018/0221242 | A1 | 8/2018 | Lee et al. |
| 2018/0289174 | A1 | 10/2018 | Ye et al. |
| 2018/0303690 | A1 | 10/2018 | Hahn et al. |
| 2018/0311097 | A1 | 11/2018 | Rodzewicz et al. |
| 2018/0353360 | A1 | 12/2018 | Kea et al. |
| 2018/0369050 | A1 | 12/2018 | Davis et al. |
| 2019/0046382 | A1 | 2/2019 | Fiset et al. |
| 2019/0049027 | A1 | 2/2019 | Bais |
| 2019/0059603 | A1 | 2/2019 | Griffith et al. |
| 2019/0083341 | A1 | 3/2019 | Ulreich et al. |
| 2019/0091084 | A1 | 3/2019 | Messerschmidt |
| 2019/0104996 | A1 | 4/2019 | Augustine et al. |
| 2019/0151177 | A1 | 5/2019 | Giap |
| 2019/0159843 | A1 | 5/2019 | Demri et al. |
| 2019/0358102 | A1 | 11/2019 | Ueda |
| 2019/0365586 | A1 | 12/2019 | Latiff et al. |
| 2020/0008976 | A1 | 1/2020 | Molloy et al. |
| 2020/0060912 | A1 | 2/2020 | Hollabaugh et al. |
| 2020/0100606 | A1 | 4/2020 | Ganji |
| 2020/0360216 | A1 | 11/2020 | Larkin et al. |
| 2021/0077327 | A1 | 3/2021 | Kurt et al. |
| 2021/0093498 | A1 | 4/2021 | Lafleche et al. |
| 2021/0401076 | A1 | 12/2021 | Jenkins et al. |
| 2022/0000692 | A1 | 1/2022 | Gomez |
| 2022/0023121 | A1 | 1/2022 | Davis |
| 2022/0096304 | A1 | 3/2022 | Kaiser et al. |
| 2022/0323283 | A1 | 10/2022 | Boulos et al. |
| 2022/0339045 | A1 | 10/2022 | Cook et al. |
| 2023/0011458 | A1 | 1/2023 | Parikh et al. |
| 2023/0064553 | A1 | 3/2023 | Fogel et al. |
| 2024/0156661 | A1 | 5/2024 | Kaforey |
| 2024/0156662 | A1 | 5/2024 | Kaforey et al. |
| 2024/0216201 | A1 | 7/2024 | Fox et al. |

FOREIGN PATENT DOCUMENTS

| | | | |
|---|---|---|---|
| CN | 208259823 | U | 12/2018 |
| CN | 211326149 | U | 8/2020 |
| CN | 306633192 | | 6/2021 |
| DE | 10 2010 007 457 | | 8/2011 |
| EP | 3 162 347 | A1 | 5/2017 |
| EP | 3 705 100 | A1 | 9/2020 |
| EP | 3 861 972 | A1 | 8/2021 |
| EP | 3 890 560 | A1 | 10/2021 |
| EP | 3 705 100 | B1 | 1/2022 |
| FR | 2923367 | A1 | 5/2009 |
| GB | 2 300 845 | A | 11/1996 |
| GB | 2 402 075 | A | 12/2004 |
| GB | 2 415 912 | | 1/2006 |
| JP | H10-117907 | A | 5/1998 |
| SE | 527345 | C2 | 2/2006 |
| WO | WO-88/10082 | A1 | 12/1988 |
| WO | WO-96/27357 | A1 | 9/1996 |
| WO | WO-02/065877 | A1 | 8/2002 |
| WO | WO-2004/050002 | A1 | 6/2004 |
| WO | WO-2005/007673 | | 1/2005 |
| WO | WO-2005/086664 | A2 | 9/2005 |
| WO | WO-2005/107673 | A1 | 11/2005 |
| WO | WO-2012/001423 | | 1/2012 |
| WO | WO-2012/170934 | A2 | 12/2012 |
| WO | WO-2015/081233 | A1 | 6/2015 |
| WO | WO-2015/081271 | A2 | 6/2015 |
| WO | WO-2017/185039 | A2 | 10/2017 |
| WO | WO-2017/197326 | A1 | 11/2017 |
| WO | WO-2019/060424 | A1 | 3/2019 |
| WO | WO-2019/152624 | A1 | 8/2019 |
| WO | WO-2020/041493 | A1 | 2/2020 |
| WO | WO-2020/136796 | A1 | 7/2020 |
| WO | WO-2022/226309 | A1 | 10/2022 |

OTHER PUBLICATIONS

"How to Set up Kool Kat", Aug. 11, 2013, Sky High Amusements, Minutes 1:55-2:30, http://www.youtube.com/watch?v=a966cR6v6sc (Year: 2013).

Dec. 4, 2012—(WO) International Search Report and Written Opinion—App PCT/US2012/041729, 15 pages.

Dec. 10, 2013—International Preliminary Report on Patentability—App PCT/US2012/041729, 8 pages.

Dec. 31, 2013—(US) Final Office Action—U.S. Appl. No. 13/014,497.

Jul. 12, 2013—(WO) International Search Report and Written Opinion—App PCT/US2013/036448, 9 pages.

Jul. 2, 2013—(US) Non-Final Office Action—U.S. Appl. No. 13/014,497.

Mar. 20, 2013—(US) Non-Final Office Action—U.S. Appl. No. 13/014,500.

Mar. 28, 2014—(US) Non-Final Office Action—U.S. Appl. No. 13/156,103.

May 15, 2014—(WO) International Search Report and Written Opinion—App PCT/US12/22572, 25 pages.

Nov. 28, 2014—(EP) Search Report—App 14159820.1.

Oct. 14, 2014—(WO)International Preliminary Report on Patentability—App PCT Application No. PCT/US2013/036448, 6 pages.

Jun. 25, 2015—(EP) Extended Search Report—App 12739957.4.

May 15, 2015—(WO) International Search Report and Written Opinion—App PCT/US2014/067672.

Sep. 14, 2015—(US) Non-Final Office Action—U.S. Appl. No. 13/838,952.

Mar. 14, 2016—(EP) Office Action—App 12739957.4.

Blaine Miller, Provisional Draft Declaration, U.S. Pat. No. 8,511,314, Reexamination Control No. 90/013,087, published Dec. 18, 2018, 11 pages.

Church et al., "Burn Wound Infections", Clinical Microbiology Reviews, 2006, vol. 19, No. 2, pp. 403-343.

Coleman Quick Pump Fitting Replacement Nozzle Main Adapter and Pinch Valve Tip, Sep. 6, 2014, Amazon.com, https://www.amazon.com/Coleman-Fitting-Replacement-Nozzle-Adapter/dp/B00JHRJ03A/ref=cm_cr_arp_d_product_top?ie=UTF8.

Craig Kaforey, Declaration, U.S. Pat. No. 8,511,314, Reexamination Control No. 90/013,087, published Sep. 10, 2014, 13 pages.

Craig Kaforey, Declaration, U.S. Pat. Nos. 8,511,314 and 8,464,720, Reexamination Control Nos. 90/013,088 and 90/013,088, published Apr. 18, 2014, 3 pages.

Craig Kaforey, Declaration, U.S. Pat. Nos. 8,511,314 and 8,464,720, Reexamination Control Nos. 90/013,088 and 90/013,088, published Sep. 10, 2014, 6 pages.

Dr. Alessio Pigazzi, Declaration, U.S. Pat. Nos. 8,511,314 and 8,464,720, Reexamination Control Nos. 90/013,088 and 90/013,088, published Sep. 10, 2014, 30 pages.

Dr. Gustavo Plasencia, Declaration, U.S. Pat. Nos. 8,511,314 and 8,464,720, Reexamination Control Nos. 90/013,088 and 90/013,088, published Sep. 10, 2014, 28 pages.

Dr. Maheswari Senthil, Declaration, U.S. Pat. No. 8,511,314, Reexamination Control No. 90/013,087, published Apr. 18, 2014, 18 pages.

Dr. Thomas Ljungman, Declaration, U.S. Pat. Nos. 8,511,314 and 8,464,720, Reexamination Control Nos. 90/013,088 and 90/013,088, published Sep. 10, 2014, 9 pages.

(56) References Cited

OTHER PUBLICATIONS

Examination Report No. 1 for AU App. No. 2019325331, issued Jul. 11, 2024, 3 pages.
Examination Report No. 1 for AU Application No. 2018285855, mailed Mar. 16, 2023, 3 pages.
Examination Report No. 1 for Australian Application No. 2017252576 dated Feb. 14, 2019, 5 pages.
Examination Report No. 1 on AU 2021209239 dtd Apr. 2, 2022 (4 pages).
Examination Report No. 3 for AU Application No. 2021209239, mailed Feb. 20, 2023, 7 pages.
Examination Report No. 4 for AU Application No. 2021209239, mailed Mar. 24, 2023, 3 pages.
Extended European Search Report for EP Application No. 19151698.8, dated Apr. 17, 2019, 6 pages.
Glenn E. Beltz, Affidavit, U.S. Pat. Nos. 8,511,314 and 8,464,720, Reexamination Control Nos. 90/013,088 and 90/013,088, published Sep. 10, 2014, 19 pages.
Gustavo Plasencia, Declaration, U.S. Pat. No. 8,511,314, Reexamination Control No. 90/013,087, published Apr. 18, 2014, 29 pages.
Immedia OneWayGlide Rehab Assist, Jun. 15, 2004 http://www.rehabassist.com.au/immedia.htm.
International Preliminary Report on Patentability for International Application No. PCT/US2017/028954, issued Oct. 23, 2018, 9 pages.
International Preliminary Report on Patentability for International Application No. PCT/US2022/018215, mailed Oct. 19, 2023, 10 pages.
International Search Report and Written Opinion for International Application No. PCT/US2017/028954, mailed Nov. 24, 2017, 16 pages.
International Search Report and Written Opinion for International Application No. PCT/US2018/037372, mailed Sep. 13, 2018, 13 pages.
International Search Report and Written Opinion for International Application No. PCT/US2019/047540, mailed Nov. 14, 2019, 13 pages.
International Search Report and Written Opinion for International Application No. PCT/US2022/018215, mailed Aug. 9, 2022, 18 pages.
Jennifer Klauschie et al., "Use of Anti-Skid Material and Patient-Positioning to Prevent Patient Shifting during Robotic-Assisted Gynecologic Procedures," J. Minim Invasive Gynecol., 2010; 17(4):504-507.
Michael Madigan, Affidavit, U.S. Pat. Nos. 8,511,314 and 8,464,720, Reexamination Control Nos. 90/013,088 and 90/013,088, published Sep. 10, 2014, 32 pages.
OneWayGlide Instruction for Use, Immedia, Version 6, 2016, p. 7.
Paul Lloyd, Declaration, U.S. Pat. Nos. 8,511,314 and 8,464,720, Reexamination Control Nos. 90/013,088 and 90/013,088, published Sep. 10, 2014, 4 pages.
Photos of Stryker Glide holding strap, date unknown, two pages.
Prism Medical Company, 5300 Ergoglide Instructions, 2009, 2 pp. Maryland Heights, MO.
Record of Oral Hearing held Dec. 14, 2015, Appeal No. 2015-007832, Reexamination Control No. 90/013,088, mailed Jan. 4, 2016.
Romedic OneWaySlide, Handicare, Dec. 6, 2010.
Soule Medical, Patient Positioning Systems Product Catalog, published Jan. 1, 2015, 63 pages.
Stryker Operations/Maintenance Manual for Stryker Glide Lateral Air Transfer System, Model 3062, date unknown, 33 pages.
Textbook of Palliative Nursing, Nov. 10, 2005, Oxford University Press, XP002740850, 1 page.
Waverley Glen, One-Way Glide—The Grimstead Range of Transfer and Repositioning Aids, Ontario Canada, downloaded Jun. 11, 2012, 3 pages.
Fanwer Positioner, Online, Published date Aug. 3, 2024, Retrieved on Aug. 14, 2025 from URL: https://www.amazon.com/Positioning-Wedge-Pillow-Connection-Positioners/dp/BODFXRKLCN (Year: 2024).
HoverMatt Positioner, Online, Published date Nov. 9, 2023, Retrieved on Aug. 14, 2025 from URL: https://WWW.youtube.com/watch?v=M LWnNkOowtA (Year: 2023).

APPARATUS AND SYSTEM FOR TURNING AND POSITIONING A PATIENT

CROSS-REFERENCE TO RELATED APPLICATIONS

This application is a divisional of U.S. patent application Ser. No. 17/567,683, filed Jan. 3, 2022, which is a divisional of U.S. patent application Ser. No. 15/635,493, filed Jun. 28, 2017, which is a divisional of U.S. patent application Ser. No. 14/555,199, filed Nov. 26, 2014, which claims the benefit of U.S. Provisional Patent Application No. 61/909,654, filed Nov. 27, 2013. All of the aforementioned applications are incorporated herein by reference in their entireties.

BACKGROUND

The present invention generally relates to an apparatus, system, and method for turning and positioning a person on a bed or the like, and, more particularly, to a sheet having a gripping surface, an absorbent pad, and/or a wedge for use in turning and positioning a person, utilizing selective glide assemblies to allow or resist movement of the components of the system in certain directions, as well as systems and methods including one or more of such apparatuses.

Nurses and other caregivers at hospitals, assisted living facilities, and other locations often care for bedridden patients that have limited or no mobility, many of whom are critically ill or injured. These immobile patients are at risk for forming pressure ulcers (bed sores). Pressure ulcers are typically formed by one or more of several factors. Pressure on a patient's skin, particularly for extended periods of time and in areas where bone or cartilage protrudes close to the surface of the skin, can cause pressure ulcers. Frictional forces and shearing forces from the patient's skin rubbing or pulling against a resting surface can also cause pressure ulcers. Excessive heat and moisture can cause the skin to be more fragile and increase the risk for pressure ulcers. One area in which pressure ulcers frequently form is on the sacrum, because a patient lying on his/her back puts constant pressure on the sacrum, and sliding of the patient in a bed can also cause friction and shearing at the sacrum. Additionally, some patients need to rest with their heads inclined for pulmonary reasons, which can cause patients to slip downward in the bed and cause further friction or shearing at the sacrum and other areas. Existing devices and methods often do not adequately protect against pressure ulcers in bedridden patients, particularly pressure ulcers in the sacral region.

One effective way to combat sacral pressure ulcers is frequent turning of the patient, so that the patient is resting on one side or the other, and pressure is taken off of the sacrum. Pillows that are stuffed partially under the patient are often use to support the patient's body in resting on his or her left or right side. A protocol is often used for scheduled turning of bedridden patients, and dictates that patients should be turned Q2, or every two hours, either from resting at a 30° angle on one side to a 30° angle on the other side, or from 30° on one side to 0°/supine (lying on his/her back) to 30° on the other side. However, turning patients is difficult and time consuming, typically requiring two or more caregivers, and can result in injury to caregivers from pushing and pulling the patient's weight during such turning. As a result, ensuring compliance with turning protocols, Q2 or otherwise, is often difficult. Additionally, the pillows used in turning and supporting the patient are non-uniform and can pose difficulties in achieving consistent turning angles, as well as occasionally slipping out from underneath the patient. Further, patients who are positioned in an inclined position on the bed tend to slide downward toward the foot of the bed over time, which can cause them to slip off of any supporting structures that may be supporting them. Still further, many patient positioning devices cannot be left under a patient for long periods of time, because they do not have sufficient breathability.

The present invention seeks to overcome certain of these limitations and other drawbacks of existing devices, systems, and methods, and to provide new features not heretofore available.

SUMMARY

The following presents a general summary of aspects of the invention in order to provide a basic understanding of the invention. This summary is not an extensive overview of the invention. It is not intended to identify key or critical elements of the invention or to delineate the scope of the invention. The following summary merely presents some concepts of the invention in a general form as a prelude to the more detailed description provided below.

Aspects of the present disclosure relate to a system for use with a bed having a frame and a supporting surface supported by the frame. The system includes a sheet having a bottom surface configured to be placed above the supporting surface of the bed and a top surface opposite the bottom surface, and a wedge having a wedge body with a base wall, a ramp surface, and a back wall, where the ramp surface is joined to the base wall to form an apex. The wedge is configured to be positioned under the sheet such that the base wall confronts the supporting surface of the bed and the ramp surface confronts the bottom surface of the sheet. The sheet has a sheet engagement member positioned on the bottom surface, and the ramp surface of the wedge has a ramp engagement member. The ramp engagement member is configured to engage the sheet engagement member to form a selective gliding assembly that resists movement of the sheet with respect to the ramp surface in a first direction, such that a first pull force necessary to create sliding movement of the sheet with respect to the ramp surface in the first direction is greater compared to a second pull force necessary to create sliding movement of the sheet with respect to the ramp surface in a second direction that is different from the first direction. The second direction may be transverse to the first direction or opposed to the first direction. For example, the second direction may be at an angle of 90° or 180° to the first direction.

According to one aspect, the ramp surface of the wedge further has a second ramp engagement member that is configured to engage the sheet engagement member to further form the selective gliding assembly to resist movement of the sheet with respect to the ramp surface in a third direction different from the first and second directions. In this configuration, a third pull force necessary to create sliding movement of the sheet with respect to the ramp surface in the third direction is greater compared to the second pull force. The ramp engagement member and the sheet engagement member may include a directional stitching material, and the second ramp engagement member may include a directional glide material in this configuration. The third direction may also be transverse or opposed to the first and/or second directions. For example, the third direction may be at an angle of 90° or 180° to the first direction. In one configuration, the first direction is parallel to at least one of the apex and the back wall of the wedge, the second direction extends from the apex toward the back wall of the wedge, and the third direction extends from the back wall toward the apex of the wedge.

According to another aspect, the sheet includes a first piece of a first material having a first coefficient of friction and a second material connected to the first piece, the second material having a second coefficient of friction, wherein the second material forms at least a portion of the top surface, and wherein the second coefficient of friction is higher than the first coefficient of friction such that the top surface provides greater slipping resistance in at least one direction, or all directions, as compared to the bottom surface.

According to a further aspect, the sheet also includes a wipeable material covering at least a portion of the top surface of the sheet.

According to yet another aspect, the wedge further includes a base engagement member on the base wall, configured to engage a surface of the bed to form a second selective gliding assembly that resists movement of the wedge with respect to the bed in at least one direction. For example, the second selective gliding assembly may resist movement of the wedge with respect to the bed in a direction extending from the apex toward the back wall of the wedge.

According to a still further aspect, the system may also include a support connected to the wedge and extending from the apex and configured to be positioned under the sheet beneath an upper thigh area of a patient. In this position, a bottom surface of the support confronts the supporting surface of the bed and a top surface of the support confronts the bottom surface of the sheet and the patient. The support may further include a support engagement member configured to engage the sheet engagement member to form a second selective gliding assembly that resists movement of the sheet with respect to the support in a direction extending parallel to at least one of the apex and the back wall of the wedge.

According to an additional aspect, the system may further include a second wedge including any or all of the components and features of the wedge described herein. The two wedges can be simultaneously placed below the patient, with one wedge supporting the upper body of the patient and another wedge supporting the lower body of the patient, leaving space for the patient's sacral area. Additionally, the sheet engagement member may be formed of a first piece of directional stitching material configured to engage the ramp engagement member of the wedge and a second piece of directional stitching material configured to engage the ramp engagement member of the second wedge.

Additional aspects of the disclosure relate to a system for use with a bed having a frame and a supporting surface supported by the frame that includes a sheet having a bottom surface configured to be placed above the supporting surface of the bed, a top surface opposite the bottom surface, a head edge configured to be placed most proximate to a head of the bed, and a foot edge configured to be placed most proximate to a foot of the bed, and a wedge having a wedge body having a base wall, a ramp surface, and a back wall, with the ramp surface joined to the base wall to form an apex. The wedge is configured to be positioned under the sheet such that the base wall confronts the supporting surface of the bed and the ramp surface confronts the bottom surface of the sheet. The bottom surface of the sheet and the ramp surface of the wedge have engagement members forming a selective gliding assembly that resists movement of the sheet with respect to the wedge in a first direction extending from the back wall toward the apex of the wedge and in a second direction extending from the head edge toward the foot edge of the sheet, such that pull forces necessary to create sliding movement of the sheet with respect to the ramp surface in the first and second directions are greater compared to a third pull force necessary to create sliding of the sheet with respect to the ramp surface in a third direction extending from the apex toward the back wall of the wedge. The system may include any other components and features described herein.

According to one aspect, the selective gliding assembly includes a directional stitching material positioned on the bottom surface of the sheet and the ramp surface of the wedge and a directional glide material also positioned on the ramp surface of the wedge.

According to another aspect, the wedge further includes a base engagement member on the base wall, configured to engage a surface of the bed to form a second selective gliding assembly that is configured to resist movement of the wedge in a direction extending from the apex toward the back wall of the wedge.

According to a further aspect, a support is connected to the wedge and extends from the apex, where the support is configured to be positioned under the sheet in an upper thigh area of a patient. In this configuration, the bottom surface of the support confronts the supporting surface of the bed and a top surface of the support confronts the bottom surface of the sheet and the patient. The support may further include a support engagement member configured to engage the sheet engagement member to form a second selective gliding assembly that resists movement of the sheet in the second direction with respect to the support.

Further aspects of the disclosure relate to a system including a sheet having a bottom surface configured to be placed above the supporting surface of the bed and a top surface opposite the bottom surface, and a wedge having a wedge body having a base wall, a ramp surface, and a back wall, the ramp surface joined to the base wall to form an apex. The wedge is configured to be positioned under the sheet such that the base wall confronts the supporting surface of the bed and the ramp surface confronts the bottom surface of the sheet. The base wall of the wedge has a base engagement member that is configured to engage a surface of the bed to form a selective gliding assembly that resists movement of the wedge with respect to the bed in a direction extending from the back wall toward the apex, such that a first pull force necessary to create sliding movement of the wedge with respect to the surface of the bed in the first direction is greater compared to a second pull force necessary to create sliding movement of the wedge with respect to the surface of the bed in any direction other than the first direction. The system may include any other components and features described herein. For example, the base engagement member may include a directional glide material.

Still further aspects of the disclosure relate to individual components of the systems described herein, including the sheet and/or the wedge(s) having any or all of the features as described herein. For example, aspects of the disclosure relate to a wedge that includes a wedge body formed at least partially of a compressible material, a base wall configured to confront the supporting surface of the bed, a ramp surface joined to the base wall to form an apex, the ramp surface configured for confronting a patient supported by the bed, a back wall extending between the base wall and the ramp surface, and two opposed side walls extending between the base wall, the ramp surface, and the back wall, with a support connected to the wedge and extending outwardly from the apex. The support is configured to be positioned in a upper thigh area of the patient, such that a bottom surface of the support confronts the supporting surface of the bed and a top surface of the support confronts the patient. The wedge may include any other components and features thereof described herein.

According to one aspect, the support includes a directional stitching material on the top surface of the support. Additionally, a directional glide material may be positioned on the ramp surface and on the base surface of the wedge, and the directional stitching material is also positioned on the ramp surface of the wedge. In this configuration, the directional glide material positioned on the base surface may resist movement of the wedge with respect to the supporting surface of the bed in a first direction from the apex toward the back wall of the wedge; the directional glide material positioned on the ramp surface of the wedge may resist movement of another surface (e.g., a sheet as described herein) with respect to the ramp surface in a second direction from the back wall toward the apex of the wedge; and the directional stitching material positioned on the top surface of the support and the ramp surface of the wedge may resist movement of the other surface with respect to the ramp surface of the wedge or the top surface of the support in a direction extending parallel to at least one of the apex and the back wall of the wedge.

Other aspects of the disclosure relate to a method for use with a system as described herein and/or individual components of such systems. For example, the method may include placing a sheet as described herein above a supporting surface of a bed and beneath a patient positioned on the bed, and inserting a wedge as described herein beneath the sheet and beneath the patient by moving the wedge away from a side edge of the bed and toward and under the patient. After insertion, the ramp surface of the wedge supports the patient in an angled position. The base wall of the wedge has an engagement member that engages a surface of the bed to form a selective gliding assembly that resists movement of the wedge with respect to the surface of the bed in a first direction away from the patient and toward the side edge of the bed, and wherein the selective gliding assembly permits movement of the wedge with respect to the surface of the bed in a second direction from the side edge of the bed toward the patient to case insertion of the wedge beneath the sheet, such that a first pull force necessary to create sliding movement of the wedge in the first direction is greater compared to a second pull force necessary to create sliding movement of the wedge in the second direction. The sheet (along with the patient) may be pulled slightly toward the side edge of the bed to properly position the patient after insertion of the wedge.

According to one aspect, the bottom surface of the sheet and the ramp surface of the wedge have additional engagement members forming a second selective gliding assembly that resists movement of the sheet with respect to the wedge in the second direction from the side edge of the bed toward the patient and permits movement of the sheet with respect to the wedge in the first direction away from the patient and toward the side edge of the bed, such that a third pull force necessary to create sliding movement of the sheet in the first direction is greater compared to a fourth pull force necessary to create sliding movement of the sheet in the second direction. In this configuration, the second selective gliding assembly further resists movement of the sheet with respect to the wedge in a third direction parallel to the side edge of the bed, such that a fifth pull force necessary to create sliding movement of the wedge in the third direction is greater compared to the fourth pull force.

According to another aspect, the wedge may also include a support as described herein. The method may further include inserting the support under an upper thigh area of the patient by pushing the support beneath the patient.

Other features and advantages of the invention will be apparent from the following description taken in conjunction with the attached drawings.

DETAILED DESCRIPTION

Figure 1:
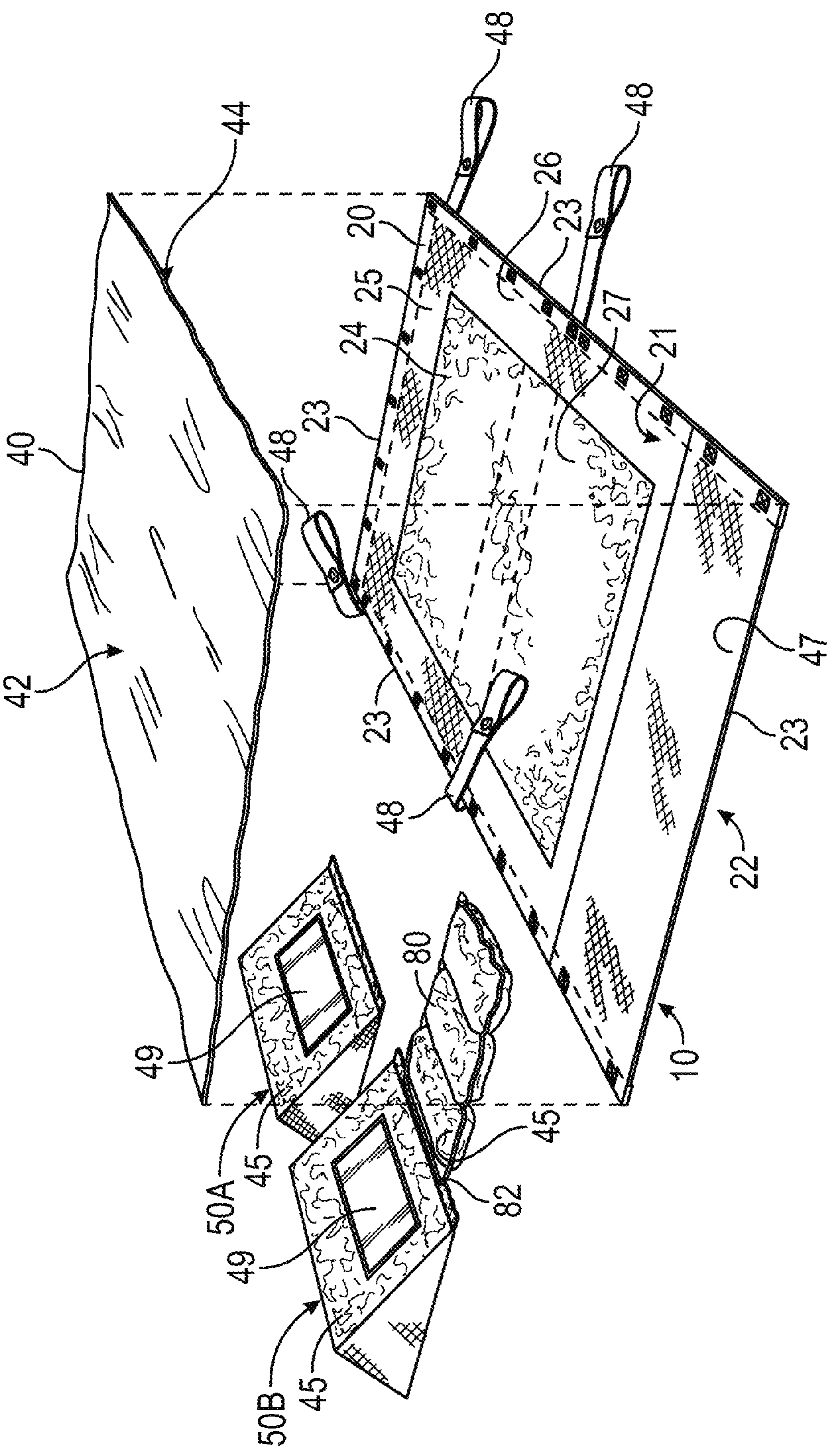
FIG. 1 is an exploded perspective view of one embodiment of a system for use in turning and positioning a patient, according to aspects of the invention.

While this invention is capable of embodiment in many different forms, there are shown in the drawings, and will herein be described in detail, certain embodiments of the invention with the understanding that the present disclosure is to be considered as an example of the principles of the invention and is not intended to limit the broad aspects of the invention to the embodiments illustrated and described.

In general, the invention relates to one or more apparatuses or devices, including a sheet having a high friction or gripping surface, an absorbent body pad configured to be placed over the sheet, and one or more wedges and a support configured to be placed underneath the sheet to support the patient in various positions where the wedge and the sheet form one or more selective gliding assemblies, as well as systems including one or more of such devices and methods utilizing one or more of such systems and/or devices. Various embodiments of the invention are described below.

Referring now to the figures, and initially to FIGS. 1-8, there is shown an example embodiment of a system 10 for use in turning and positioning a person resting on a surface, such as a patient lying on a hospital bed. As shown in FIG. 1, the system 10 includes a sheet 20, an absorbent body pad 40 configured to be placed over the sheet 20, one or more wedges 50 configured to be placed under the sheet 20, and a support 80 configured to be placed under the sheet 20. The patient can be positioned on top of the body pad 40, with the body pad 40 lying on the sheet 20, and one or more wedges 50 and/or the support 80 optionally positioned underneath the sheet 20.

As shown in FIGS. 8-10*d*, the system 10 is configured to be placed on a bed 12 or other support apparatus for supporting a person in a supine position. The bed 12 generally includes a frame 14 and a supporting surface 16 supported by the frame 14, as shown in FIGS. 8-10*d*, and has a head 13, a foot 17 opposite the head 13, and opposed sides or edges 19 extending between the head 13 and the foot 17. The supporting surface 16 can be provided by a mattress 18 or similar structure, and in various embodiments, the mattress 18 can incorporate air pressure support, alternating air pressure support and/or low-air-loss (LAL) technology. These technologies are known in the art, and utilize a pump motor or motors (not shown) to effectuate airflow into, over and/or through the mattress 18. For beds having LAL technology, the top of the mattress 18 may be breathable so that the airflow can pull heat and moisture vapor away from the patient. The bed 12 may also include one or more bed sheets 15 (such as a fitted sheet or flat sheet), as shown in FIGS. 10*a*-*d* and 11*a*-*d*, as well as pillows, blankets, additional sheets, and other components known in the art. Further, the bed 12 may be an adjustable bed, such as a typical hospital-type bed, where the head 13 (or other parts) of the bed 12 can be raised and lowered, such as to incline the patient's upper body. It is understood that the system 10 and the components thereof can be used with other types of beds 12 as well.

In example embodiments described herein, the apparatus 10 has one or more selective gliding assemblies 60 positioned between components of the apparatus 10 to permit sliding of the components relative to each other in certain directions and to resist sliding of the components relative to each other in at least one direction. The selective gliding assemblies 60 are formed by one or more directionally-oriented engagement members positioned between the components and configured to engage the components to permit and limit sliding in specified directions.

Figure 13:
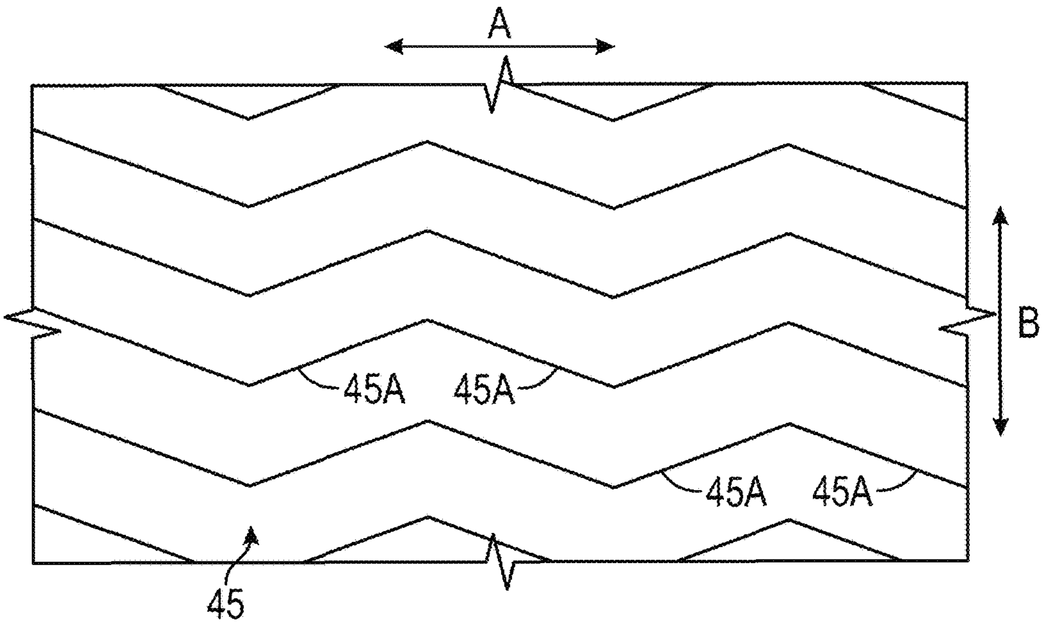
FIG. 13 is a schematic plan view of one engagement member of a selective glide assembly of the system of FIG. 1.

One type of engagement member that is usable in connection with the apparatus 10 is a stitched material 45 with a directional stitching pattern that extends along a particular direction, such as a herringbone or zig-zag stitching pattern (see FIG. 13), to assist in allowing the engagement member to glide along one axis and to resist gliding along another axis. As seen in FIG. 13, the herringbone stitching pattern shown is relatively open, with links 45A forming angles of 90° or greater, such that each link 45A in the stitching pattern extends a greater distance along axis A than along axis B. In one embodiment, the links 45A may form angles of approximately 120°, approximately 110°-180° (straight line), or 90° or greater with respect to each other. Other directional stitching patterns may be utilized, including other directional stitching patterns with links 45A that are oriented and/or sized differently. In one example, the engagement member 62 may have stitching in the form of a plurality of parallel or substantially parallel lines extending generally a single direction. The directional stitching material 45 as shown in FIG. 13 permits sliding in directions generally along the axis A, or in other words, along the directions in which the stitching pattern extends. The directional stitching material 45 as shown in FIG. 13 resists sliding in directions generally along the axis B, or in other words, across the stitches and/or transverse to the directions in which the stitching pattern extends.

One example of a stitched material usable as the directional stitching material 45 is a loop material (e.g. as used in a hook-and-loop connection), with a directional stitching pattern located on the reverse side of the loop material. This loop material may be connected to a component of the apparatus 10 with the loop side facing inward and the reverse side facing outward to form the surface of the engagement member. The directional stitching material 45 may be formed of a different material in another embodiment, including, without limitation, a variety of different fabric materials. It is understood that such materials may include a directional stitching pattern. The directional stitching material 45 may be connected to a component of the apparatus in a surface-to-surface, confronting relation to form a layered structure in one embodiment, such as by stitching, adhesive, sonic welding, heat welding and other techniques, including techniques familiar to those skilled in the art.

Figure 12:
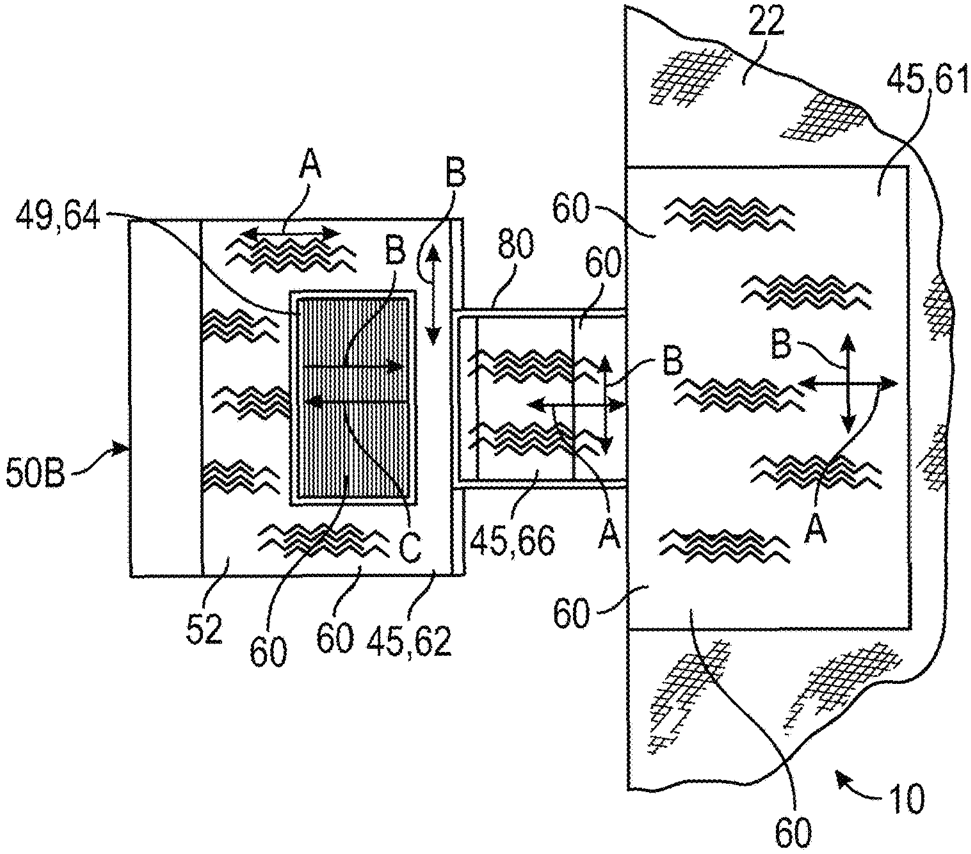
FIG. 12 is a schematic plan view of various selective glide assemblies of the system of FIG. 1, with arrows schematically illustrating directions of free movement and directions of resistance to movement between the components of the system.

As used in some embodiments described herein, two pieces of a directional stitching material 45, such as shown in FIG. 12, can be used in engagement with each other, with the axes A and B of the stitching patterns of the two pieces in alignment, to provide increased resistance to sliding along the axis B. The two pieces of directional stitching material 45 may be the same type of material or different types of material in various embodiments, and may have the same or different stitching patterns. This directional stitching material 45 may also be used in connection with other directionally-oriented engagement members to achieve increased resistance to sliding in selected directions. In various uses, the directional stitching material 45 may have a directional stitching pattern that extends primarily in the lateral or width direction of the apparatus 10 (i.e. between side edges 23, or primarily in the longitudinal or length direction of the apparatus 10 (i.e. between the front edge 23 and rear edge 23.

Other materials having directionally oriented textures, patterns, etc., extending in a specified direction may be usable in connection with the apparatus 10 as engagement members. For example, such a material may have a ridged or other textured structure. The directionally oriented texture may have a shape and/or orientation that is similar to one of the embodiments of the directional stitching patterns described above. Such a textured structure may be created by various techniques, including weaving, texturing (e.g. physical deformation), or application of a substance such as by printing, deposition, etc., among other techniques. Such other materials may function in the same manner as the directional stitching material 45 discussed above.

Another type of engagement member that is usable in connection with the apparatus 10 is a directional glide material, such as a brushed fiber material or other brushed fabric material, which may have fibers that lie facing a specific direction. In general, a directional glide material resists gliding in a single direction and permits relatively free gliding in the opposite direction and along an axis perpendicular to the single direction, such that the resistance to gliding in the single direction is significantly higher than any of these three other directions identified. Additionally, a directional glide material may have structural characteristics to create this resistance and freedom for gliding in specific directions, such as structural elements that are directionally oriented. For example, the directional glide material may include projecting structures, e.g., ridges, fibers, bristles, etc., that extend non-perpendicularly from the surface of a substrate, a majority or substantial entirety of which are oriented (e.g., angled, curved, etc.) in the same general direction. One embodiment of an engagement member may be a brushed nylon fiber material (e.g. lint brush material) with about 44-48 wales per inch and about 54-58 courses per inch in one embodiment. Another type of directional glide material may be used in other embodiments, including various ridged fabric and non-fabric materials, such as a flexible ratchet material as used in a zip-tie. The directional glide material may be connected to a component of the apparatus in a surface-to-surface, confronting relation to form a layered structure in one embodiment, such as by stitching, adhesive, sonic welding, heat welding and other techniques, including techniques familiar to those skilled in the art. This directional glide material can be used in connection with a directional stitching material 45 as shown in FIG. 12 to create a selective gliding assembly 60 with a "one-way" glide arrangement. This arrangement allows the engagement members to glide with the grain of the directional glide material, while resisting gliding in other directions, including the opposite direction along the same axis as the gliding direction.

As described herein with respect to the embodiment of FIGS. 1-8, the apparatus may use selective gliding assemblies 60 to create directional gliding between the wedges 50 and the underside of the sheet 20, between the wedges 50 and the bed 12, and between the support 80 and the underside of the sheet 20. In other embodiments, selective gliding assemblies 60 may be used to create directional gliding between one or more of the above sets of components and/or between one or more other components of the apparatus 10.

Figure 2:
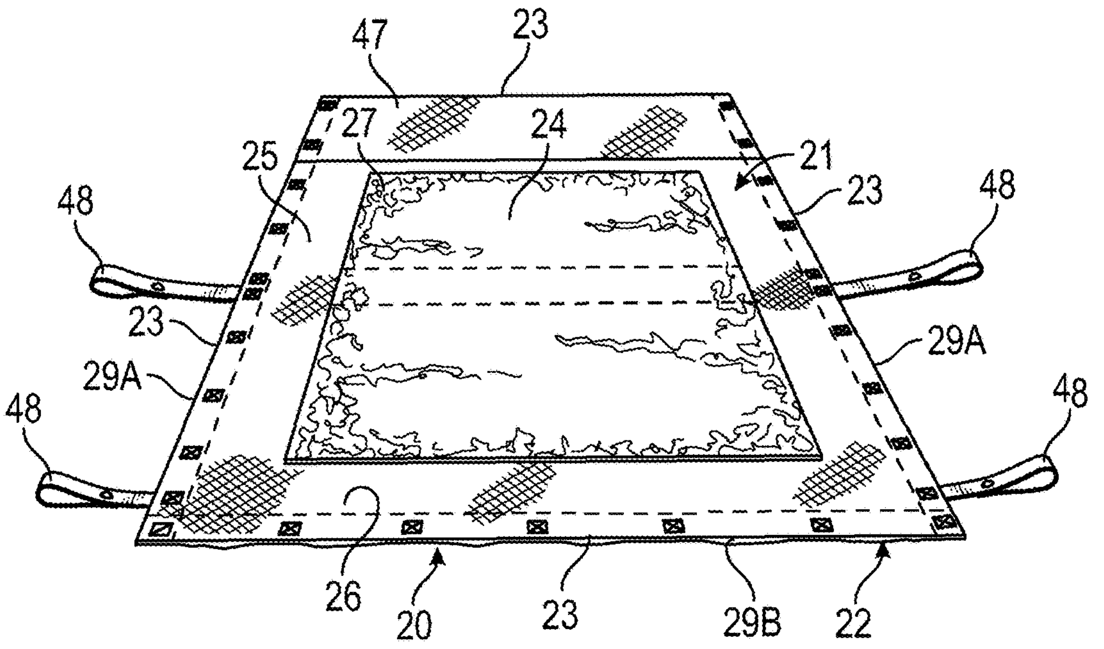
FIG. 2 is a top elevation view of a flexible sheet of the system of FIG. 1.
Figure 3:
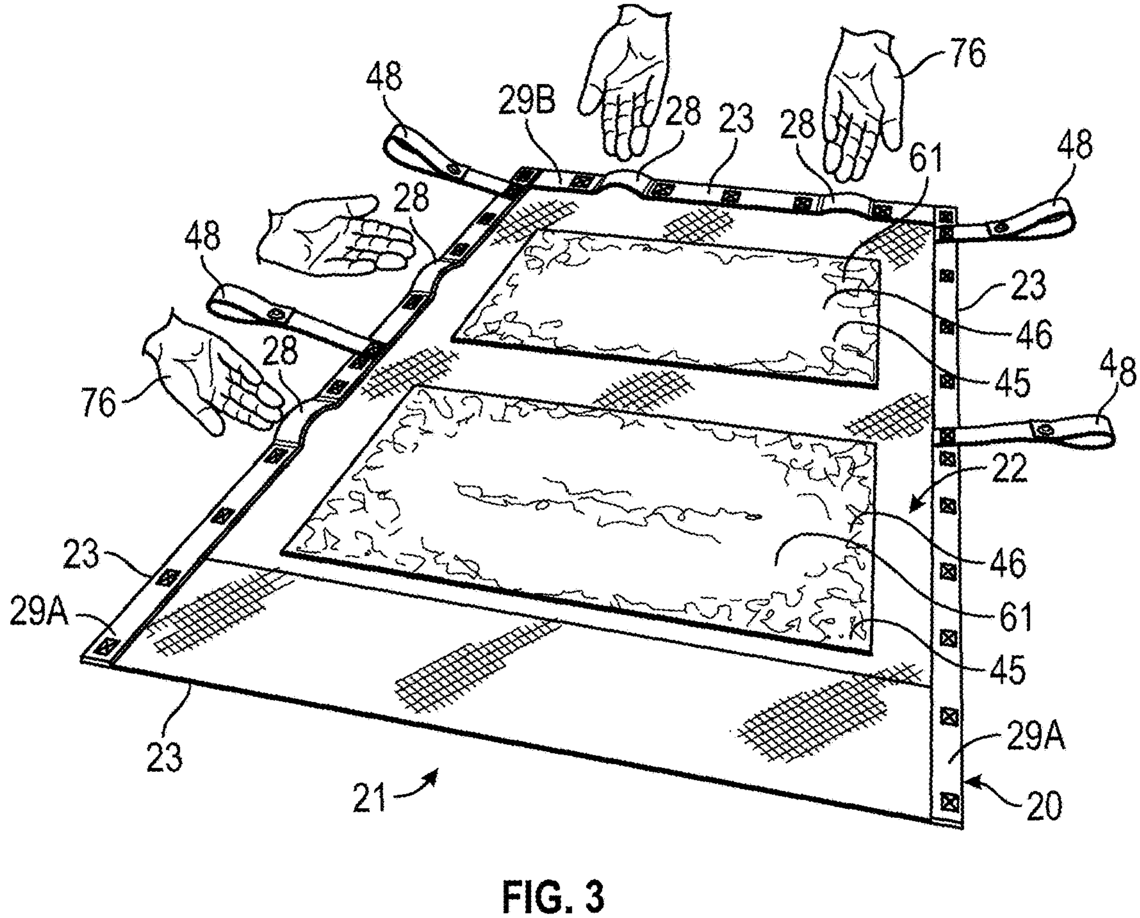
FIG. 3 is a bottom perspective view of the flexible sheet of FIG. 2.
Figure 4:
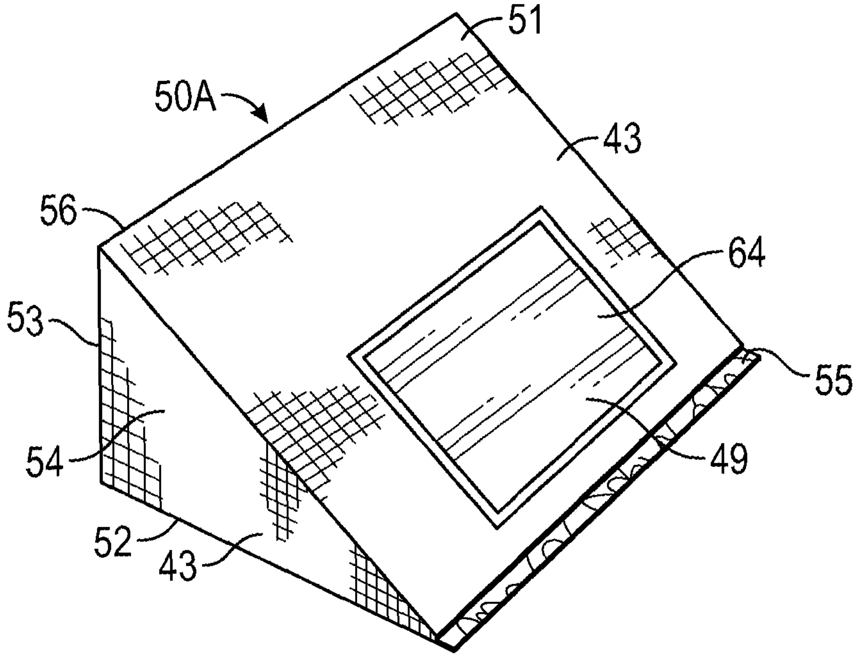
FIG. 4 is a bottom perspective view of a wedge of the system of FIG. 1.
Figure 5:
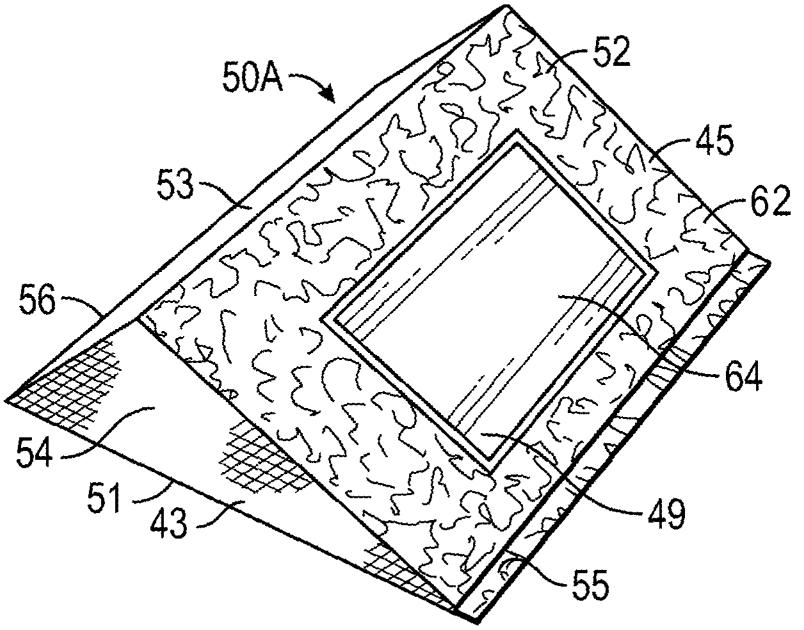
FIG. 5 is a top perspective view of the wedge of FIG. 4.
Figure 6:
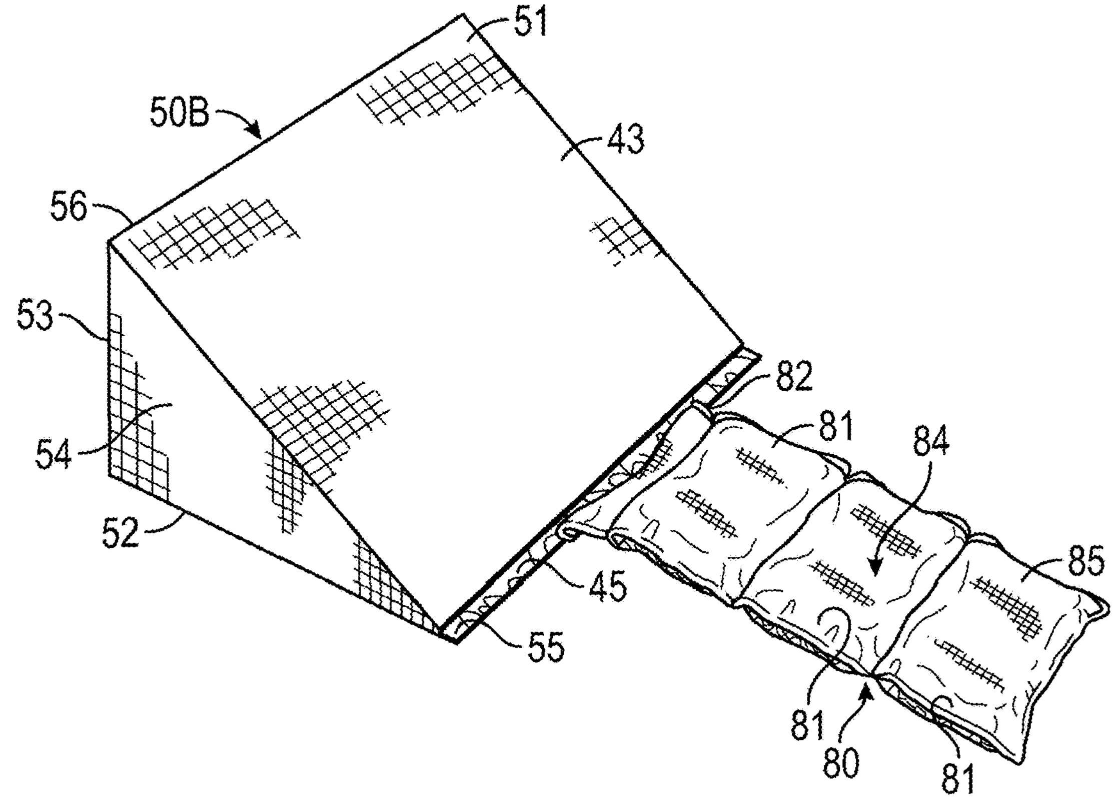
FIG. 6 is a bottom perspective view of a wedge and support of the system of FIG. 1.
Figure 7:
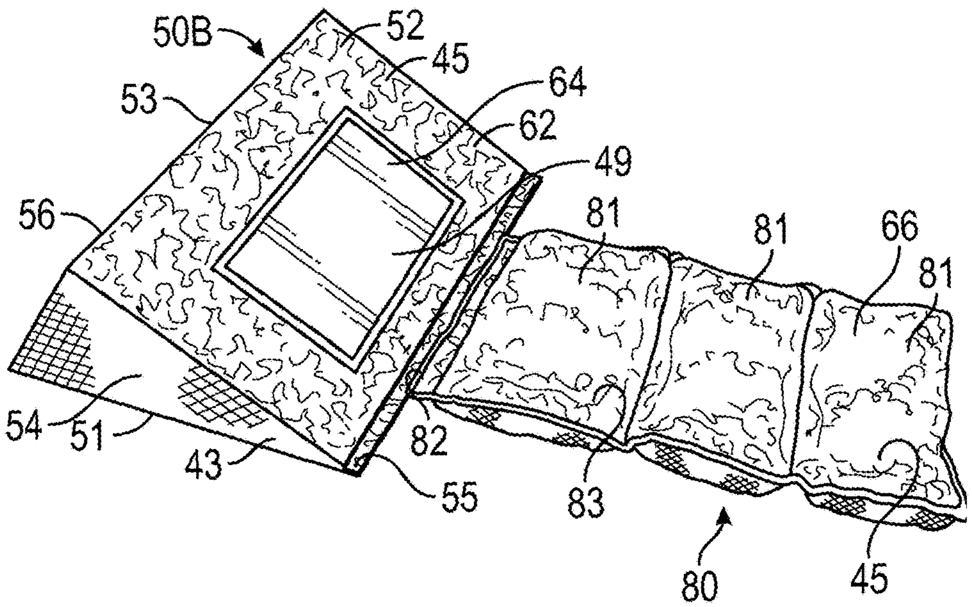
FIG. 7 is a top perspective view of the wedge and support of FIG. 6.
Figure 8:
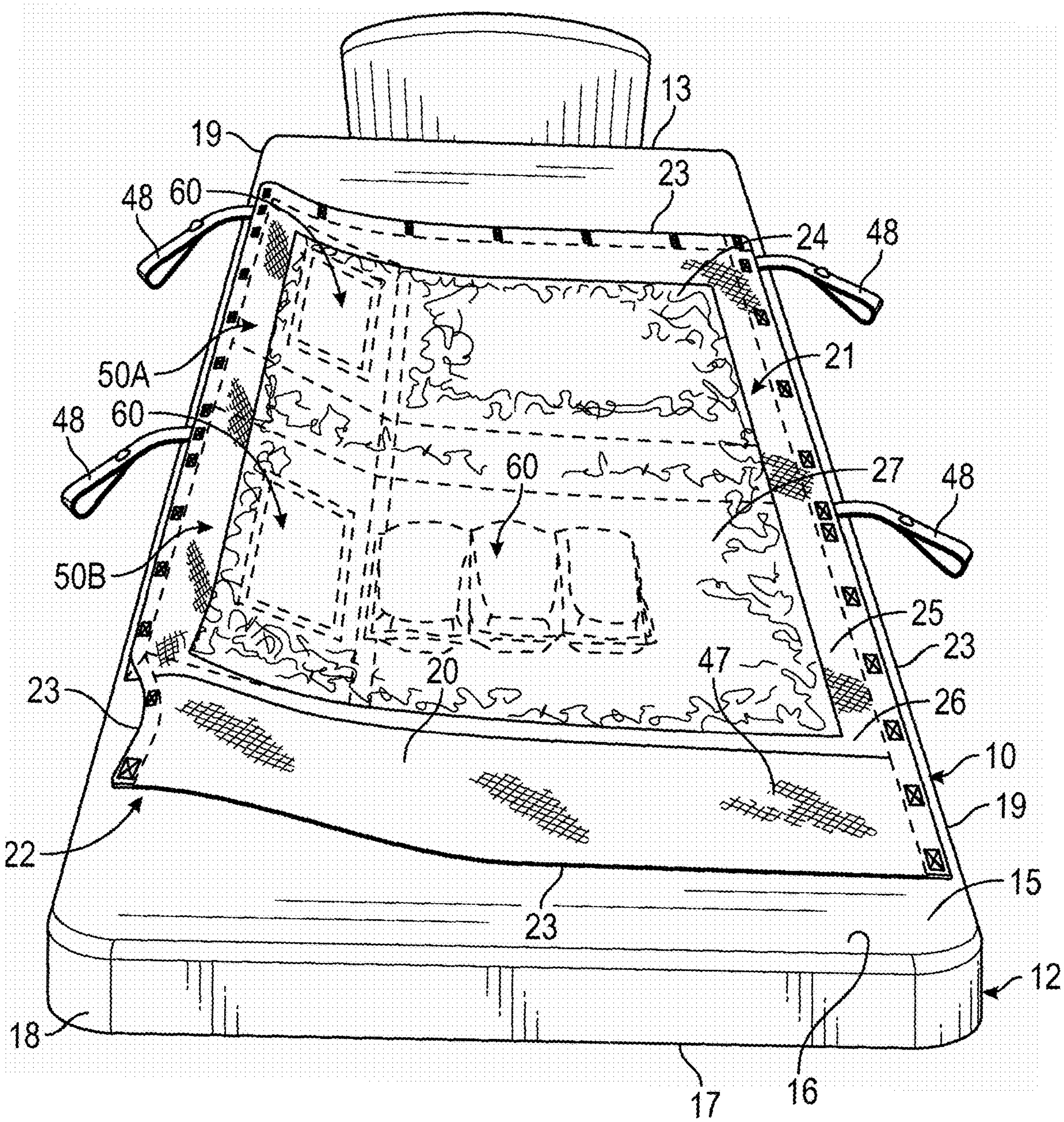
FIG. 8 is a top view of a sheet, wedges, and a support of the system of FIG. 1.

An example embodiment of the sheet 20 of the apparatus is shown in greater detail in FIGS. 2-3. In general, the sheet 20 is flexible and foldable, and has a top surface 21 and a bottom surface 22 defined by a plurality of peripheral edges 23. The sheet 20 is configured to be positioned on the bed 12 so that the bottom surface 22 is above the supporting surface 16 of the bed 12 and faces or confronts the supporting surface 16, and is supported by the supporting surface 16. As used herein, "above," "below," "over," and "under" do not imply direct contact or engagement. For example, the bottom surface 22 being above the supporting surface 16 means that that the bottom surface 22 may be in contact with the supporting surface 16, or may face or confront the supporting surface 16 and/or be supported by the supporting surface 16 with one or more structures located between the bottom surface 22 and the supporting surface 16, such as a bed sheet 15 as described above. Likewise, "facing" or "confronting" does not imply direct contact or engagement, and may include one or more structures located between the surface and the structure it is confronting or facing.

As seen in FIGS. 2-3, the sheet 20 in this embodiment is rectangular, having four peripheral edges 23, but could be a different shape in other embodiments. The top surface 21 has at least a portion formed of a high-friction or gripping material 24, and the bottom surface 22 has at least a portion formed of a directional stitching material 45. In this embodiment, the sheet includes a first piece 26 of sheet material that is formed partially or entirely of a low-friction material 25, with a second piece 27 of sheet material that is formed partially or entirely of the high-friction material 24, with the second piece 27 connected to the first piece 26 in a surface-to-surface, confronting relation to form a layered structure. The sheet 20 further has one or more additional pieces 46 of sheet material that is formed partially or entirely of the directional stitching material 45. As illustrated in FIGS. 2-3, the first piece 26 is larger than the second piece 27, so that the first piece 26 forms portions of both the top and bottom surfaces 21, 22 of the sheet 20, and the second piece 27 forms at least a portion of the top surface 21, with the edges of the second piece 27 being recessed from the edges 23 of the sheet 20. Additionally, the one or more additional pieces 46 form at least a portion of the bottom surface 22 of the sheet 20, with the edges of the additional pieces 46 being recessed from the edges 23 of the sheet. In the embodiment of FIGS. 2-3, the sheet 20 has two additional pieces 46 that are positioned on the bottom surface 22 and are spaced from each other. The second piece 27 may form at least a majority portion of the top surface 21, and/or the additional piece(s) 46 may form at least a majority portion of the bottom surface 22, in various embodiments. In other words, in this embodiment, the sheet 20 is primarily formed by the first piece 26, with the second piece 27 and additional piece(s) 46 connected to the first piece 26 to form at least a part of the top and bottom surfaces 21. In another embodiment, the first piece 26 may form at least a majority portion of the top and/or bottom surfaces 21, 22. The pieces 26, 27, 46 are connected by stitching in one embodiment, but may have additional or alternate connections in other embodiments, including adhesives, sonic welding, heat welding and other techniques, including techniques familiar to those skilled in the art.

The low-friction material 25 and/or the high-friction material 24 may be formed by multiple pieces in other embodiments. For example, the first piece 26 made of the low-friction material 25 may have a plurality of strips or patches of the high-friction material 24 connected on the top surface 21 in one embodiment. In a further embodiment, the high friction material 24 may be or include a coating applied to the low friction piece 26, such as a spray coating. As described in greater detail below, the low-friction material 25 permits sliding of the sheet 20 in contact with the supporting surface 16 of the bed 12, which may include a fitted bed sheet 15 or other sheet, and the high-friction material 24 provides increased resistance to slipping or sliding of the patient and/or the body pad 40 on which the patient may be lying, in contact with the sheet 20.

As shown in the embodiment in FIGS. 1-8, the first piece 26 is made substantially entirely of the low-friction material 25. In one embodiment, the low-friction material 25 is at least partially made from polyester and/or nylon (polyamide), although other materials can be used in addition to or instead of these materials. In one embodiment, the high friction material 24 is a knitted material, which can enhance comfort, and may be made of polyester and/or another suitable material. The material 24 can then be treated with a high friction substance, such as a hot melt adhesive or appropriate plastic, which can be applied as a discontinuous coating to promote breathability. The high-friction and/or low-friction materials 24, 25 can also be treated with a water repellant, such as polytetrafluoroethylene (PTFE). In other embodiments, the high-friction and/or low-friction materials 24, 25 may include any combination of these components, and may contain other components in addition to or instead of these components. Additionally, both the first and second pieces 26, 27 may be breathable in one embodiment, to allow passage of air, heat, and moisture vapor away from the patient.

Generally, the high friction material 24 has a coefficient of friction that is higher than the coefficient of friction of the low friction material 25. In one embodiment, the coefficient of friction for the high friction material 24 is about 8-10 times higher than the coefficient of friction of the low friction material 25. In another embodiment, the coefficient of friction for the high friction material 24 is between 5 and 10 times higher, or at least 5 times higher, than the coefficient of friction of the low friction material 25. The coefficient of friction, as defined herein, can be measured as a direct proportion to the pull force necessary to move either of the materials 24, 25 in surface-to-surface contact with the same third material, with the same normal force loading. Thus, in the embodiments above, if the pull force for the high friction material 24 is about 8-10 times greater than the pull force for the low friction material 25, with the same contact material and normal loading, the coefficients of friction will also be 8-10 times different. It is understood that the coefficient of friction may vary by the direction of the pull force, and that the coefficient of friction measured may be measured in a single direction. For example, in one embodiment, the above differentials in the coefficients of friction of the high friction material 24 and the low friction material 25 may be measured as the coefficient of friction of the low friction material 25 based on a pull force normal to the side edges 23 (i.e. proximate the handles 28) and the coefficient of friction of the high friction material 24 based on a pull force normal to the top and bottom edges 23 (i.e. parallel to the side edges 23).

Additionally, the coefficient of friction of the interface between the high-friction material 24 and the pad 40 is greater than the coefficient of friction of the interface between the low friction material 25 and the bed sheet 15 or supporting surface 16. It is understood that the coefficients of friction for the interfaces may also be measured in a directional orientation, as described above. In one embodiment, the coefficient of friction for the interface of the high friction material 24 is about 8-10 times higher than the coefficient of friction of the interface of the low friction material 25. In another embodiment, the coefficient of friction for the interface of the high friction material 24 is between 5 and 10 times higher, or at least 5 times higher, than the coefficient of friction of the interface of the low friction material 25. It is understood that the coefficient of friction for the interface could be modified to at least some degree by modifying factors other than the sheet 20. For example, a high-friction substance or surface treatment may be applied to the bottom surface 44 of the pad 40, to increase the coefficient of friction of the interface. An example of a calculation of the coefficients of friction for these interfaces is described below, including a rip-stop nylon material as the low friction material 25 and a knitted material treated with a hot melt adhesive as the high friction material 24. The relative coefficients of friction of the high friction material 24 and the low friction material 25 are described in greater detail in U.S. Patent Application Publication No. 2012/0186012, published Jul. 26, 2012, which is incorporated by reference herein in its entirety and made part hereof.

In the embodiment of FIGS. 1-8, the sheet 20 also has a "wipeable" material 47 positioned on at least on the top surface 21 of the sheet 20. This wipeable material 47 may be formed as a coating on the sheet 20, such as on the low friction material 25, in one embodiment. The wipeable material 47 may have various properties, such as smoothness, low tackiness, water repellence, etc., which may facilitate wiping liquid or semi-liquid substances from the material 47. For example, the wipeable material 47 may be formed by a coating of a silicone material, a urethane material, a silicone-urethane copolymer material, polytetrafluoroethylene (PTFE), or other materials that can create a wipeable surface on the sheet 20. In another embodiment, the wipeable material 47 may be a separate piece of material that is connected to the sheet 20, such as by adhesives or other bonding, stitching, fasteners, etc. The wipeable material 47 in the embodiment of FIGS. 1-8 is positioned on the top surface 21 proximate the bottom edge 23 of the sheet 20, between the high friction material 24 and the bottom edge 23, which generally corresponds to the area at or below the sacral region of the patient when in the supine position. The absorbent pad 40 may at least partially cover the wipeable material 47 in one configuration, depending on the relative sizes of the sheet 20 and the pad 40. In other embodiments, the wipeable material 47 may cover a different portion of the top surface 21 and/or may cover portions of other surfaces of the sheet 20, such as the underside or bottom surface 22. It is understood that the wipeable material 47 may further be configured to form a barrier to passage of fluids/moisture.

The sheet 20 has one or more engagement members 61 of a selective gliding assembly 60 on the bottom surface 22, to permit movement of the sheet 20 in desired directions and resist movement of the sheet 20 in undesired directions. In the embodiment of FIGS. 1-8, the sheet 20 has two engagement members 61 formed as separate patches of directional stitching material 45 (which may be referred to as "sheet engagement members"). In this embodiment, the axis B (along which gliding is resisted) is oriented to extend between the top and bottom edges 23 and parallel to the side edges 23, and the axis A (along which gliding is allowed) is oriented to extend between the side edges 23 and parallel to the top and bottom edges 23. Relative to the wedge 50A-B, the axis B is oriented to extend parallel to at least one of the apex 55 and the back wall 53 of the wedge and/or between the side walls 54, and the axis A is oriented to extend between the apex and the back wall of the wedge and/or parallel to the side walls 54. This arrangement is illustrated schematically in FIG. 12. In another embodiment, the engagement members 61 may be formed as a single, larger patch or a larger number of patches of the directional stitching material 45. In a further embodiment, one or more of the engagement members 61 may be formed of a different directionally-oriented material, and/or may be oriented to allow/resist gliding in different directions. For example, if both of the engagement members 61 as depicted in FIGS. 1-8 are turned 90°, then movement in a direction extending between the side edges 23 and parallel to the top and bottom edges 23 would be resisted, and movement in a direction extending between the top and bottom edges 23 and parallel to the side edges 23 would be allowed.

In one embodiment, as illustrated in FIGS. 1-8, the sheet 20 may also include one or more handles 28, 48 to facilitate pulling, lifting, and moving the sheet 20. As shown in FIGS. 2-3, the sheet 20 has handles 28 formed by strips 29A-B of a strong material that are stitched in periodic fashion to the bottom surface 22 at or around both side edges 23 of the sheet 20, as well as the top edge 23 of the sheet. The non-stitched portions can be separated slightly from the sheet 20 to allow a user's hands 76 to slip underneath, and thereby form the handles 28, as shown in FIG. 3. The handles 28 formed by the strips 29A on the side edges 23 of the sheet 20 are useful for pulling the sheet 20 laterally, to move the patient 70 laterally on the bed 12. The sheet 20 also includes handles 48 in the form of straps that are stitched to the bottom surface 22 of the sheet 20 and extend from the sheet 20. The handles 48 extend generally outward and toward the top edge 23 of the sheet 20. In one embodiment, the handles 48 more proximate the top edge 23 of the sheet 20 have a shorter length than the handles 48 more proximate the bottom edge 23 of the sheet 20. For example, the top-most handles 48 may have a length of about 10 inches, and the bottom-most handles 48 may have a length of about 16 inches, with the length measured from the sheet 20 to the end of the handles 48. In this configuration, the handles 48 are useful for pulling the sheet 20 toward the head 13 of the bed 12 to "boost" the patient 70 and apparatus 10 if they begin to slide toward the foot 17 of the bed 12, which may tend to happen especially when the patient 70 is inclined. The handles 28 formed by the strip 29B on the top edge 23 of the sheet 20 may also be useful for boosting the patient 70 as well. For example, the handles 28 on the top edge 23 of the sheet 20 may be useful when a single caregiver is gripping the sheet to boost the patient 70. It is understood that the handles 28 formed by strips 29A on the side edges 23 of the sheet 20 can also be used for "boosting" the patient 70. Additionally, any of the handles 28, 48 may be used for rolling the patient right or left, such as in FIGS. 10*a-b*. The sheet 20 in FIGS. 1-8 includes four handles 48, but in other embodiments, a larger or smaller number of handles 48 may be used. In other embodiments, the sheet 20 may include a different number or configuration of the handles 28, 48 as described above. Further, the handles 28 may be connected to the sheet 20 in a different way, such as by heat welding, sonic welding, adhesive, etc. Other types of handles may be utilized in further embodiments.

The strip 29B on the top edge 23 of the sheet 20 may further function as a positioning marker to assist in properly positioning the sheet 20 beneath the patient. A positioning marker in this position assists with positioning the sheet 20 beneath the patient when the sheet 20 is rolled or folded up, such as in FIG. 10*a*, where the bottom surface 22 of the sheet 20 will be visible. The strip 29B indicates which edge 23 of the sheet is the top, to avoid the sheet 20 being placed on the bed 12 upside down or sideways. Additionally, the strip 29B can function as a positioning marker to be aligned with the shoulders of the patient to assist in proper positioning. Other types of positioning markers may be used in other embodiments, including additional markers or other markers that take the place of the strip 29B or other positioning markers in other positions. It is understood that additional or alternate positioning markers may be used in other embodiments to assist with various aspects of positioning the sheet 20, such as a marker to indicate proper alignment with respect to the patient's hips.

In further embodiments, the sheet 20 and the components thereof may have different configurations, such as being made of different materials or having different shapes and relative sizes. For example, in one embodiment, the low-friction material 25 and the high-friction material 24 may be made out of pieces of the same size. In another embodiment, the low-friction material 25 and the high-friction material 24 may be part of a single piece that has a portion that is processed or treated to create a surface with a different coefficient of friction. As an example, a single sheet of material could be treated with a non-stick coating or other low-friction coating or surface treatment on one side, and/or an adhesive or other high-friction coating or surface treatment on the other side. In additional embodiments, the low-friction material 25, the high-friction material 24, and the wipeable material 47 may occupy different portions of the sheet 20, or one or more of these materials may not be present. Still other embodiments are contemplated within the scope of the invention.

In an alternate embodiment, the sheet 20 may not utilize a high friction surface, and instead may utilize a releasable connection to secure the pad 40 in place with respect to the sheet 20. For example, the sheet 20 and pad 40 may include complementary connections, such as hook-and-loop connectors, buttons, snaps, or other connectors. In a further embodiment, the sheet 20 may be used without a pad 40, with the patient directly in contact with the top surface 21 of the sheet, and the high-friction material 24 can still resist sliding of the patient on the sheet 20.

The body pad 40 is typically made from a different material than the sheet 20 and contains an absorbent material, along with possibly other materials as well. The pad 40 provides a resting surface for the patient, and can absorb fluids that may be generated by the patient. The pad 40 may also be a low-lint pad, for less risk of wound contamination, and is typically disposable and replaceable, such as when soiled. The top and bottom surfaces 42, 44 may have the same or different coefficients of friction. Additionally, the pad 40 illustrated in the embodiments of FIGS. 1 and 10 is approximately the same size as the sheet 20, and both the sheet 20 and the pad 40 are approximately the same width as the bed 12 so that the edges 23 of the sheet 20 and the edges of the pad 40 are proximate the side edges of the bed 12, but may be a different size in other embodiments.

In one embodiment, the pad 40 may form an effective barrier to fluid passage on one side, in order to prevent the sheet 20 from being soiled, and may also be breathable, in order to permit flow of air, heat, and moisture vapor away from the patient and lessen the risk of pressure ulcers (bed sores). The sheet 20 may also be breathable to perform the same function, as described above. A breathable sheet 20 used in conjunction with a breathable pad 40 can also benefit from use with a LAL bed 12, to allow air, heat, and moisture vapor to flow away from the patient more effectively, and to enable creation of an optimal microclimate around the patient. The pad 40 may have differently configured top and bottom surfaces 42, 44, with the top surface 42 being configured for contact with the patient and the bottom surface 44 being configured for contact with the sheet 20.

The system 10 may include one or more wedges 50A-B that can be positioned under the sheet 20 to provide a ramp and support to slide and position the patient slightly on his/her side, as described below. FIGS. 4-7 illustrate example embodiments of wedges 50A-B that can be used in conjunction with the system 10. The wedge 50A-B has a body 56 that can be triangular in shape, having a base wall or base surface 51, a ramp surface 52 that is positioned at an oblique angle to the base wall 51, a back wall 53, and side walls 54. In this embodiment, the base wall 51 and the ramp surface 52 meet at an oblique angle to form an apex 55, and the back wall 53 is positioned opposite the apex 55 and approximately perpendicular to the ramp surface 52. The apex 55 may be the smallest angle of any of the corners of the wedge 50A-B, in one embodiment. The side walls 54 in this embodiment are triangular in shape and join at approximately perpendicular angles to the base wall 51, the ramp surface 52, and the back wall 53. In this embodiment, the surfaces 51, 52, 53, 54 of the wedge body 56 are all approximately planar when not subjected to stress, but in other embodiments, one or more of the surfaces 51, 52, 53, 54 may be curved or rounded. Any of the edges between the surfaces 51, 52, 53, 54 of the wedge body 56 may likewise be curved or rounded, including the apex 55.

The wedge body 56 in this embodiment is at least somewhat compressible or deformable, in order to provide greater patient comfort and case of use. Any appropriate compressible material may be used for the wedge body 56, including various polymer foam materials, such as a polyethylene and/or polyether foam. A particular compressible material may be selected for its specific firmness and/or compressibility, and in one embodiment, the wedge body 56 is made of a foam that has relatively uniform compressibility.

The wedge 50A-B is configured to be positioned under the sheet 20 and the patient, to position the patient at an angle, as described in greater detail below. In this position, the base wall 51 of the wedge 50A-B faces downward and engages or confronts the supporting surface 16 of the bed 12, and the ramp surface 52 faces toward the sheet 20 and the patient and partially supports at least a portion of the weight of the patient. The angle of the apex 55 between the base wall 51 and the ramp surface 52 influences the angle at which the patient is positioned when the wedge 50A-B is used. In one embodiment, the angle between the base wall 51 and the ramp surface 52 may be up to 45°, or between 15° and 35° in another embodiment, or about 30° in a further embodiment. Positioning a patient at an angle of approximately 30° is currently clinically recommended, and thus, a wedge 50A-B having an angle of approximately 30° may be the most effective for use in positioning most immobile patients. If clinical recommendations change, then a wedge 50A-B having a different angle may be considered to be the most effective. The wedge 50A-B may be constructed with a different angle as desired in other embodiments. It is understood that the sheet 20 may be usable without the wedges 50A-B, or with another type of wedge, including any commercially available wedges, or with pillows in a traditional manner. For example, the sheet 20 may be usable with a single wedge 50A-B having a greater length, or a number of smaller wedges 50A-B, rather than two wedges 50A-B, in one embodiment. As another example, two wedges 50A-B may be connected together by a narrow bridge section or similar structure in another embodiment. It is also understood that the wedge(s) 50A-B may have utility for positioning a patient independently and apart from the sheet 20 or other components of the system 10, and may be used in different positions and locations than those described and illustrated herein.

In one embodiment, the wedges 50A-B may have a directionally-oriented material (e.g., a directional stitching material 45, directional glide material, etc.) covering at least a portion of the ramp surface 52, and potentially other surfaces as well. In the embodiments illustrated in FIGS. 4-7, the wedges 50A-B have the directional stitching material 45 covering the ramp surface 52. In another embodiment, the directional stitching material 45 may additionally or alternately cover the base wall 51, the back wall 53, and/or the side walls 54. The directional stitching material 45 in this embodiment forms an engagement member 62 (which may be referred to as a "ramp engagement member"), of a selective gliding assembly 60 on at least the ramp surface 52. In this embodiment, the directional stitching material 45 on the ramp surface 52 has the axis B (along which gliding is resisted) extending between the side walls 54 and parallel to the apex edge 55, as illustrated in FIG. 12. Accordingly, the axis A (along which gliding is allowed) extends perpendicular to the apex edge 55 and parallel to the side walls 54 in this embodiment, as illustrated in FIG. 12. In this arrangement, the directional stitching material 45 resists movement of the wedges 50A-B in directions parallel to the ramp surface 52 and perpendicular to the side walls 54, as described in greater detail herein. Similarly, the directional stitching material 45 resists movement of another surface in contact with the directional stitching material 45 (e.g., the bottom surface 22 of the sheet 20) relative to the wedges 50A-B in directions along to the ramp surface 52 (i.e., parallel to the apex 55 and/or the back wall 51) and perpendicular to the side walls 54. The directional stitching material 45 also engages the engagement members 61 of the directional stitching material 45 on the bottom surface 22 of the sheet 20 to enhance the selective gliding effect of the selective gliding assembly. This arrangement is illustrated schematically in FIG. 11*d*. The other surfaces (e.g., the base wall 51, the back wall 53, and the side walls 54) of the wedges 50A-B are covered by a wrapping material 43 in the embodiment of FIGS. 1-8. This wrapping material 43 may be a taffeta fabric or other suitable material. In another embodiment, one or more of these surfaces may not be covered by any material, so that the inner material of the wedges 50A-B is exposed, or one or more of these surfaces may be partially covered by a material.

In the embodiments illustrated in FIGS. 4-7, the wedges 50A-B also have engagement members 64 in the form of patches of a directional glide material 49 located on one or more surfaces. The wedge 50A illustrated in FIGS. 4-5 has engagement members 64 of the directional glide material 49 located on the ramp surface 52 and the base wall 51 (which may also be referred to as a "ramp engagement member" and a "base engagement member," respectively). The wedge 50B illustrated in FIGS. 6-7 has an engagement member 64 of the directional glide material 49 located on the ramp surface 52. Each of the engagement members 64 in this embodiment have the directional glide material 49 oriented so that the direction C of allowed movement of another surface with respect to the base wall 51 or the ramp surface 52 extends from the apex 55 toward the back wall 53, as illustrated in FIG. 12. For example, for a brushed nylon fiber material, the fibers would be angled toward the back wall 53, so that gliding over the engagement member 64 in the direction C from the apex 55 toward the back wall 53 is free, while gliding in the opposite direction D from the back wall 53 toward the apex 55 is resisted. It is understood that this gliding is explained above with respect to the movement of another surface in contact with the directional glide material 49 (e.g., the bottom surface 22 of the sheet 20 or the bed sheet 15) relative to the wedge 50A-B. This same directional relationship can alternately be expressed as resisting movement of the wedge 50A-B with respect to the other surface in a direction from the apex 55 toward the back wall 53 (e.g., resisting the wedge 50A-B from moving away from the patient), while allowing free gliding of the wedge 50A-B with respect to the other surface in a direction from the back wall 53 toward the apex 55 (e.g., allowing easy insertion of the wedge 50A-B beneath the sheet 20).

In the embodiments illustrated in FIGS. 4-7, the patches of the directional glide material 49 covered only a portion of the surfaces 51, 52 on which they were located, such that the edges of the directional glide material 49 are spaced from the edges of the respective surfaces on which they are located. In this configuration, the amount of the directional glide material 49 is sufficient to provide good resistance to unwanted slipping, but is not excessively expensive and leaves part of the directional stitching material 45 on the ramp surface 52 exposed to provide further functionality. For example, in one embodiment, the directional glide material 49 may cover approximately 20-40% of the surface area of the respective surface on which it is disposed, and in another embodiment, the directional glide material 49 may cover approximately 25-30% of the respective surface. In other embodiments, the directional glide material 49 may be located, sized, and/or oriented differently, and generally cover at least a portion of the surfaces on which they are located. Additionally, each of the patches of the directional glide material 49 may have a border to help resist abrasion, fraying, and or other wear, as shown in FIGS. 4-7. Such a border may be created by stitching (e.g., serge stitch), addition of a durable material, or other technique. Further, each of the patches of the directional glide material 49 may be connected to the wedge 50A-B by stitching, adhesive or other bonding, and/or other techniques. The engagement members 64 may have other configurations in other embodiments, including using different types of directionally-oriented materials.

As described above, the engagement members 62 of the directional stitching material 45 on the ramp surfaces 52 of the wedges 50A-B engage the engagement members 61 of the directional stitching material 45 on the bottom surface 22 of the sheet 20 to enhance the selective gliding effect of the selective gliding assembly 60. This engagement resists movement of the sheet 20 with respect to the wedges 50A-B along the axis B, and particularly, in the direction from the top edge 23 to the bottom edge 23 of the sheet 20, or in other words, from the head 13 to the foot 17 of the bed 12. In one embodiment, the directional stitching material 45 sliding upon another piece of the same material provides a resistance to sliding along the axis B on both pieces of material that is at least 3× greater (e.g., 3.6X in one embodiment) than the resistance to sliding along the axis A on both pieces of material. In other embodiments, the directional stitching material 45 sliding upon another piece of the same material provides a resistance to sliding along the axis B on both pieces of material that is at least 2× greater, or at least 2.5× greater, than the resistance to sliding along the axis A on both pieces of material. These and all other relative measurements of resistance to sliding described herein may be calculated using ASTM D1894. Additionally, the engagement members 64 of the directional glide material 49 engage the engagement members 61 of the directional stitching material 45 on the bottom surface 22 of the sheet 20 to resist movement of the sheet 20 with respect to the wedges opposite to the direction C, from the back wall 53 toward the apex 55 of the wedges 50A-B, or in other words, to resist sliding of the sheet 20 down the slope of the ramp surface 52. In one embodiment, the directional stitching material 45 sliding upon the directional glide material 49 along the axis A of the material 45 and in the direction D of the material 49 provides a resistance to sliding that is at least 3× greater (e.g., 3.5× in one embodiment) than the resistance to sliding along the axis A and in the direction C. In another embodiment, the directional stitching material 45 sliding upon the directional glide material 49 along the axis A of the material 45 and in the direction D of the material 49 provides a resistance to sliding that is at least 2× greater, or at least 2.5× greater, than the resistance to sliding along the axis A and in the direction C. Additionally, in one embodiment, the directional stitching material 45 sliding upon the directional glide material 49 along the axis B of the material 45 (perpendicular to the directions C and D of the material 49) provides a resistance to sliding that is at least 3.5× greater (e.g., 4.1X in one embodiment) than the resistance to sliding along the axis A and in the direction C. In another embodiment, the directional stitching material 45 sliding upon the directional glide material 49 along the axis B of the material 45 (perpendicular to the directions C and D of the material 49) provides a resistance to sliding that is at least 2× greater, at least 2.5× greater, or at least 3× greater, than the resistance to sliding along the axis A and in the direction C.

The combination of these engagements between the engagement members 61, 62, 64 creates a selective gliding assembly 60 with a "one-way" gliding arrangement between the sheet 20 and the wedges 50A-B, where the sheet 20 can only freely move in the direction C toward the back walls 53 of the wedges 50A-B, which allows the sheet 20 and the patient 70 to be pulled up onto the ramp surfaces 52 of the wedges 50A-B without resistance, as described herein. The engagement member 64 of the directional glide material 49 on the base wall 51 of the wedge 50A also resists sliding of the wedge 50A away from the apex 55, or in other words, resists sliding of the wedge 50A out from underneath the sheet 20. In one embodiment, the directional glide material 49 sliding against a typical bed sheet material in the direction D provides a resistance to sliding that is at least 2.5× greater (e.g., 2.9X in one embodiment) than the resistance to sliding in the direction C. Additionally, in one embodiment, the directional glide material 49 sliding against a typical bed sheet material perpendicular to the directions C and D (i.e. toward the foot 17 of the bed 12) also provides a resistance to sliding that is at least 2.5× greater (e.g., 2.5× in one embodiment) than the resistance to sliding in the direction C. The base walls 51 of the wedges 50A-B may also include a material or feature to offer some resistance to sliding of the wedges 50A-B along the axis B in one embodiment, and particularly, in the direction from the top edge 23 to the bottom edge 23 of the sheet 20, or in other words, from the head 13 to the foot 17 of the bed 12. For example, a directional stitching material 45 or another directionally-oriented material may be used for this purpose. The resistance to sliding provided by such material may be less than the resistance of the selective gliding assemblies 60 between the sheet 20 and the ramp surfaces 52 of the wedges 50A-B, such that the sheet 20 will not be encouraged to slide relative to the wedges 50A-B, and the sheet 20, the pad 40, the wedges 50A-B, and the patient 70 may move together without slipping relative to one another.

As described herein, the selective gliding assemblies 60 can resist movement in one or more directions and allow free movement in one or more different directions, which may be transverse or opposed to each other. It is understood that the "resistance" to sliding may be expressed using a difference in pull force necessary to create sliding movement between the same pieces of material in different directions. For example, if a selective gliding assembly is considered to "resist" sliding in one direction and "allow" sliding in another direction, this may be determined by having a relatively greater pull force necessary to create sliding movement between two engaging materials in the former direction and a relatively smaller pull force necessary to create sliding movement between the same two materials in the latter direction. The difference in resistance may be expressed quantitatively as well, such as described elsewhere herein. In one embodiment, a selective gliding assembly 60 may resist movement in one direction and may allow movement in another direction that is opposed (i.e., angled 180° to) the first direction. In another embodiment, a selective gliding assembly 60 may resist movement in one direction and may allow movement in another direction angled 90° to the first direction. In a further embodiment, a selective gliding assembly 60 may allow movement in one direction and may resist movement in at least two other directions angled 90° and 180° to the first direction. Still further types of directional gliding assemblies 60 may be constructed using materials as described herein and/or additional materials with directional properties.

In other embodiments, the apparatus 10 may include a different type of supporting device other than the wedges 50A-B illustrated in FIGS. 1-8, such as a different type or configuration of wedge or a different type of supporting device. For example, the wedges 50A-B may be joined together to form a single wedge in one embodiment, which may include a gap at the sacral area. As another example, the apparatus 10 may include a supporting device in the form of a pillow or cushion. It is understood that any supporting device for turning patients 70 that may be included with the apparatus 10 may include any of the features of the wedges 50A-B described herein, including the engagement members 62, 64 for forming selective glide assemblies 60.

Figure 9:
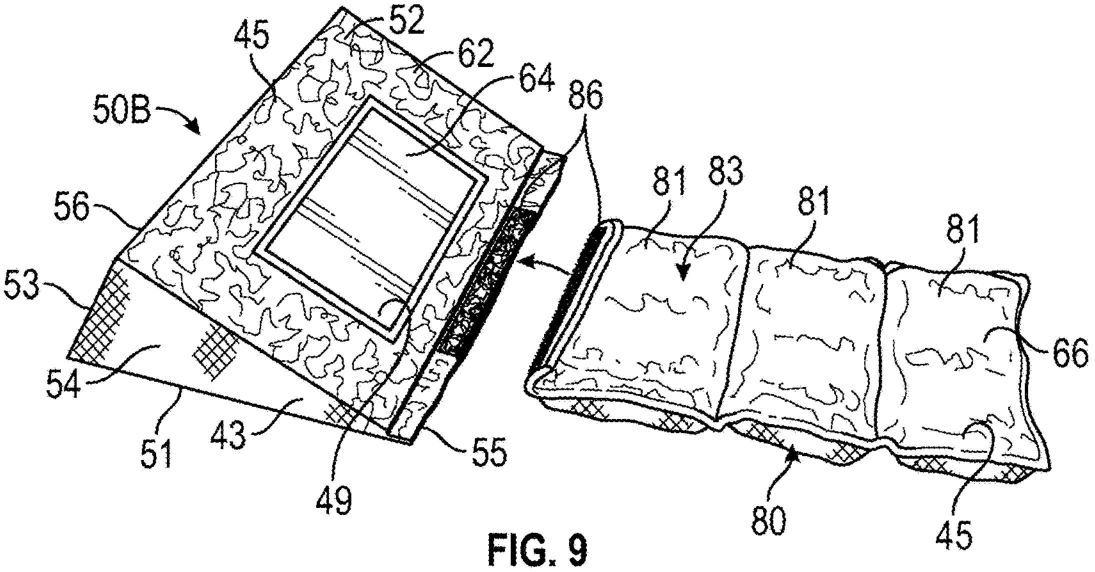
FIG. 9 is a top perspective view of another embodiment of a wedge and support usable in connection with the system of FIG. 1.

The apparatus 10 may further include a support 80 configured to be placed adjacent the sacral area of the patient 70, such as the back of the upper thighs of the patient 70, below the patient's buttocks. The support 80 may be connected to one of the wedges 50A-B. In the embodiment illustrated in FIGS. 1-8, one of the wedges 50B has the support 80 connected proximate the apex 55 and extending outwardly from the apex 55. The support 80 in this embodiment is a pad or pillow that is filled with a fiber fill material, and is divided into three chambers 81, which are formed by stitched boundaries. In one embodiment, each chamber 81 may be about 9.5"×6" in size and may contain approximately 48 g of fiber fill material. In other embodiments, the support 80 may have a different number of chambers 81, or may include only a single chamber. The support 80 may use additional or alternate filling in another embodiment as well, including foam materials, bladders to hold air or other fluids, etc. Additionally, in the embodiment illustrated in FIGS. 1-8, the support 80 is connected to the wedge 50B by a stitched connection 82 at one end. The connection 82 between the support 80 and the wedge 50B allow the components to be handled and inserted simultaneously, avoid possible positioning conflicts between the components, and assist in ensuring that the support is accurately and consistently positioned. In other embodiments, the support 80 may be connected in a different configuration. For example, as shown in FIG. 9, the support 80 may be connected to the wedge 50B by a hook-and-loop (e.g. Velcro) connection 86. As another example, the support 80 may not be connected to the wedge 50B at all. The support 80 may be shaped and/or connected differently in further embodiments.

The support 80 may also include an engagement member 66 forming part of a selective gliding assembly 60, such as a directional stitching material 45, a directional gliding material, or other directionally-oriented material. In the embodiment illustrated in FIGS. 1-8, the support 80 has an engagement member 66 on the top surface 83, in the form of a directional stitching material 45 (which may also be referred to as a "support engagement member"). The directional stitching material 45 may generally cover at least a portion of the top surface 83 of the support 80, and in the embodiment illustrated in FIGS. 1-8, the directional stitching material 45 covers all or substantially all of the top surface 83 of the support 80. In this embodiment, the axis B (along which gliding is resisted) of the directional stitching material 45 is oriented to extend across the elongation direction of the support 80 and parallel to the apex edge 55 of the wedge 50B, and the axis A (along which gliding is allowed) is oriented to extend parallel to the elongation direction of the support 80 and away from the apex 55 of the wedge 50B. The engagement member 66 on the top surface 83 of the support 80 is configured to engage the engagement member 61 on the bottom surface 22 of the sheet 20 in order to form a selective gliding assembly 60. In this arrangement, the selective gliding assembly 60 formed by the engagement members 61, 66 resists gliding of the sheet 20 relative to the support 80 along the axis B extending between the top and bottom edges 23 of the sheet 20 and between the head 13 and the foot 17 of the bed. In particular, this arrangement resists sliding of the sheet 20 downward toward the foot 17 of the bed 12 separately from the support 80, which can both retain the support 80 in proper position relative to the patient 70 and resist sliding of the patient 70 downward on the bed 12. This arrangement is illustrated schematically in FIG. 12. The bottom surface 84 of the support 80 is at least partially formed or covered by a low friction material 85, which may be the same low friction material 25 as used in the sheet 20. This low friction material 85 facilitates sliding the support 80 beneath the patient 70, as described herein, and also facilitates the support 80 and the wedge 50B with the sheet 20, such that the sheet 20 and/or the patient 70 do not move relative to the support 80 and the wedge 50B. In another embodiment, at least a portion of the bottom surface 84 may include such an engagement member to resist sliding on the bed 12.

All or some of the components of the system 10 can be provided in a kit, which may be in a pre-packaged arrangement, as described in U.S. Patent Application Publication No. 2012/0186012, published Jul. 26, 2012, which is incorporated by reference herein in its entirety and made part hereof. For example, the sheet 20 and the pad 40 may be provided in a pre-folded arrangement or assembly, with the pad 40 positioned in confronting relation with the top surface 21 of the sheet 20, in approximately the same position that they would be positioned in use, and the sheet 20 and pad 40 can be pre-folded to form a pre-folded assembly 65, as illustrated in FIG. 10. The pre-folded assembly 65 can be unfolded when placed beneath a patient, as shown in FIG. 10. It is understood that different folding patterns can be used. The pre-folded sheet 20 and pad 40 can then be unfolded together on the bed 12, as described below, in order to facilitate use of the system 10. Additionally, the sheet 20 and the pad 40 can be packaged together, by wrapping with a packaging material to form a package, and may be placed in the pre-folded assembly 65 before packaging. The one or more wedges 50 may also be included in the package, in one embodiment. Other packaging arrangements may be used in other embodiments.

Example embodiments of methods for utilizing the system 10 are illustrated in FIGS. 10-11. FIGS. 10*a*-*d* illustrate an example embodiment of a method for placing the sheet 20 and pad 40 under a patient 70, which utilizes a pre-folded assembly 65 of the sheet 20 and pad 40. The method is used with a patient 70 lying on a bed 12 as described above, and begins with the sheet 20 and pad 40 unfolded length-wise in a partially-folded configuration. As shown in FIG. 10*a*, the patient 70 is rolled to one side, and the pre-folded assembly 65 is placed proximate the patient 70, so that a first side 71 of the assembly 65 is ready for unfolding, and the second side 73 is bunched under and against the back of the patient 70. The sheet 20 and pad 40 should be properly positioned at this time, to avoid the necessity of properly positioning the sheet 20 and pad 40 after the patient 70 is lying on top of them. In this embodiment, the sheet 20 is properly positioned when the top strip 29B is positioned near the head 13 of the bed 12 and approximately aligned with the shoulders of the patient 70, with the patient 70 positioned with his/her sacral area at the joint 72 where the bed 12 inclines (see FIG. 10*d*). The pad 40 is properly positioned in the pre-folded assembly 65, but may require positioning relative to the sheet 20 if the pad 40 is instead provided separately.

Figure 10A:
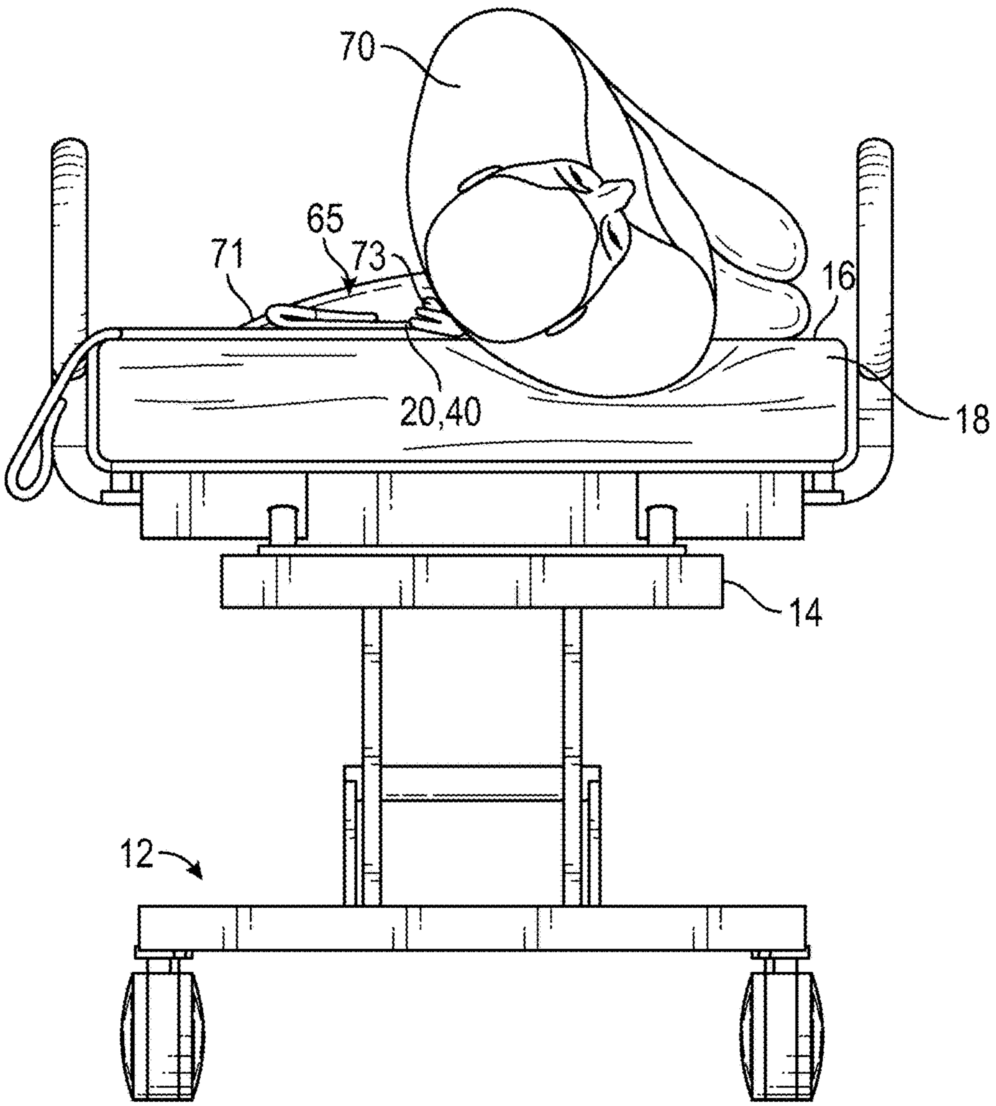
FIGS. 10*a-d* are a sequential series of views illustrating a method of placing the flexible sheet and an absorbent pad of the system of FIG. 1 on a bed.
Figure 10B:
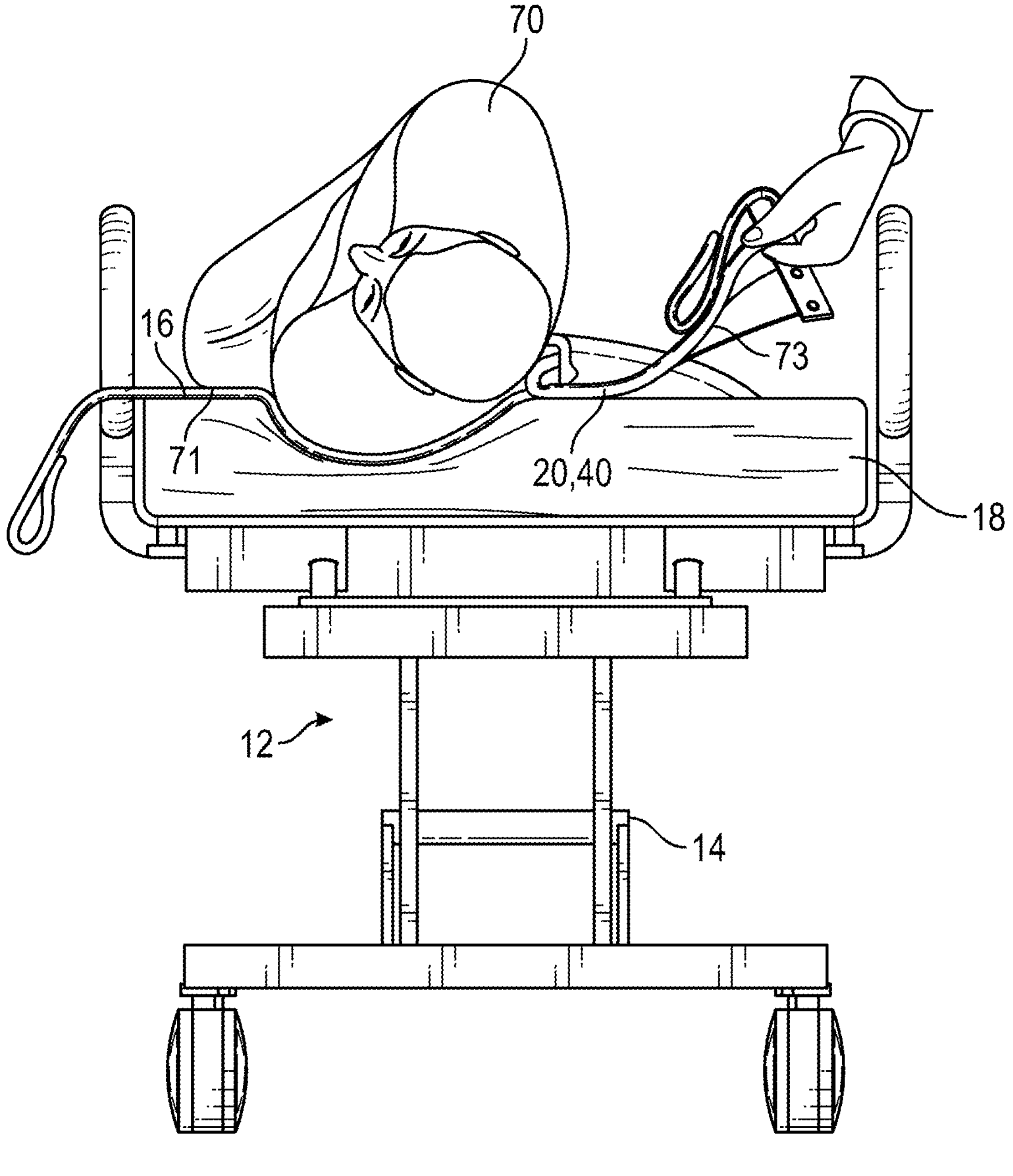
Figure 10C:
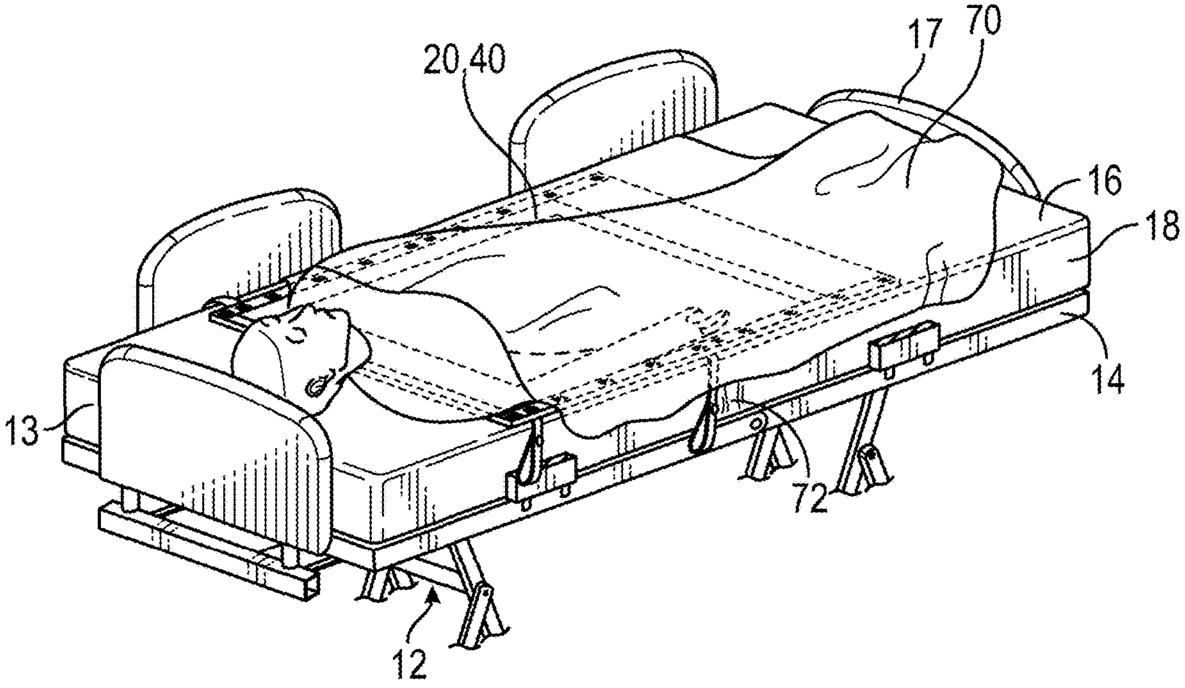
Figure 10D:
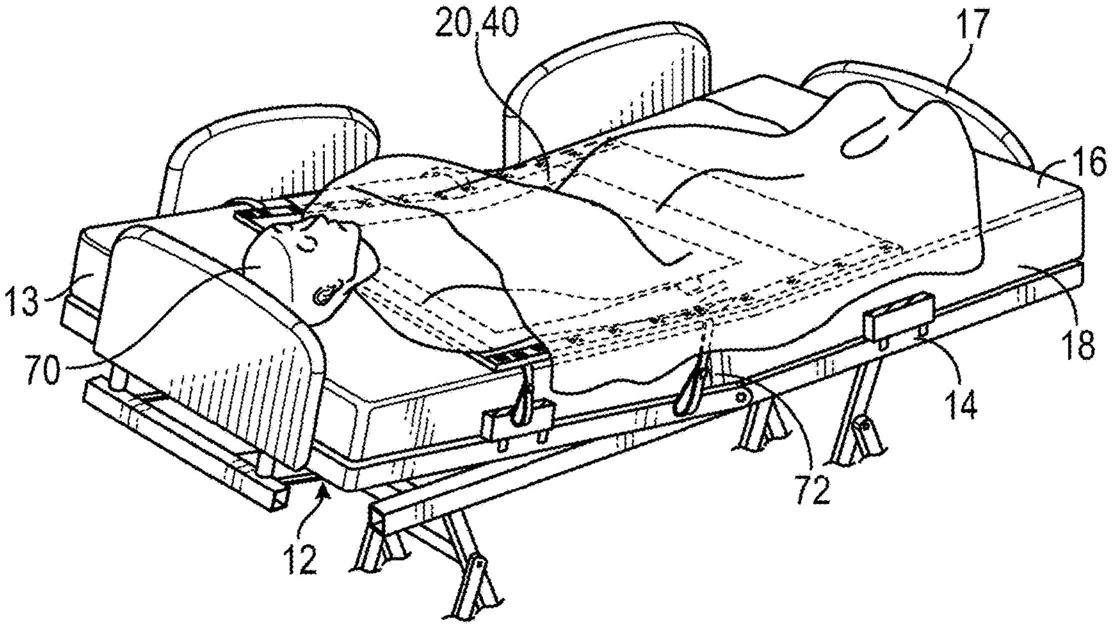

After positioning the second side 73 of the sheet 20 and pad 40 under or proximate the patient's back, the first side 71 of the sheet 20 and pad 40 assembly 65 (on the left in FIGS. 10*a*-*b*) is unfolded onto the bed 12. This creates a folded portion that is bunched under the patient 70 and an unfolded portion that is unfolded on the bed 12. The patient 70 is then rolled in the opposite direction, so that the second side 73 of the sheet 20 and pad 40 can be unfolded on the bed 12, as shown in FIG. 10*b*. The sheet 20 and pad 40 may be provided in a folded arrangement where the first and second sides 71, 73 of the sheet 20 and pad 40 can be unfolded away from the center. The patient 70 can then be rolled onto his/her back on top of the sheet 20 and pad 40. The patient 70 may be moved slightly to ensure proper positioning after unfolding the assembly 65, which can be accomplished by sliding the sheet 20 using the handles 28, 48. The bed 12 can then be inclined if desired. The method illustrated in FIGS. 10*a-d* typically requires two or more caregivers for performance, but is less physically stressful and time consuming for the caregivers than existing methods. The pad 40 can be removed and replaced by rolling the patient 70 and unfolding the pad 40 using a method similar to the method described herein with respect to FIGS. 10*a-d.*

Figure 11A:
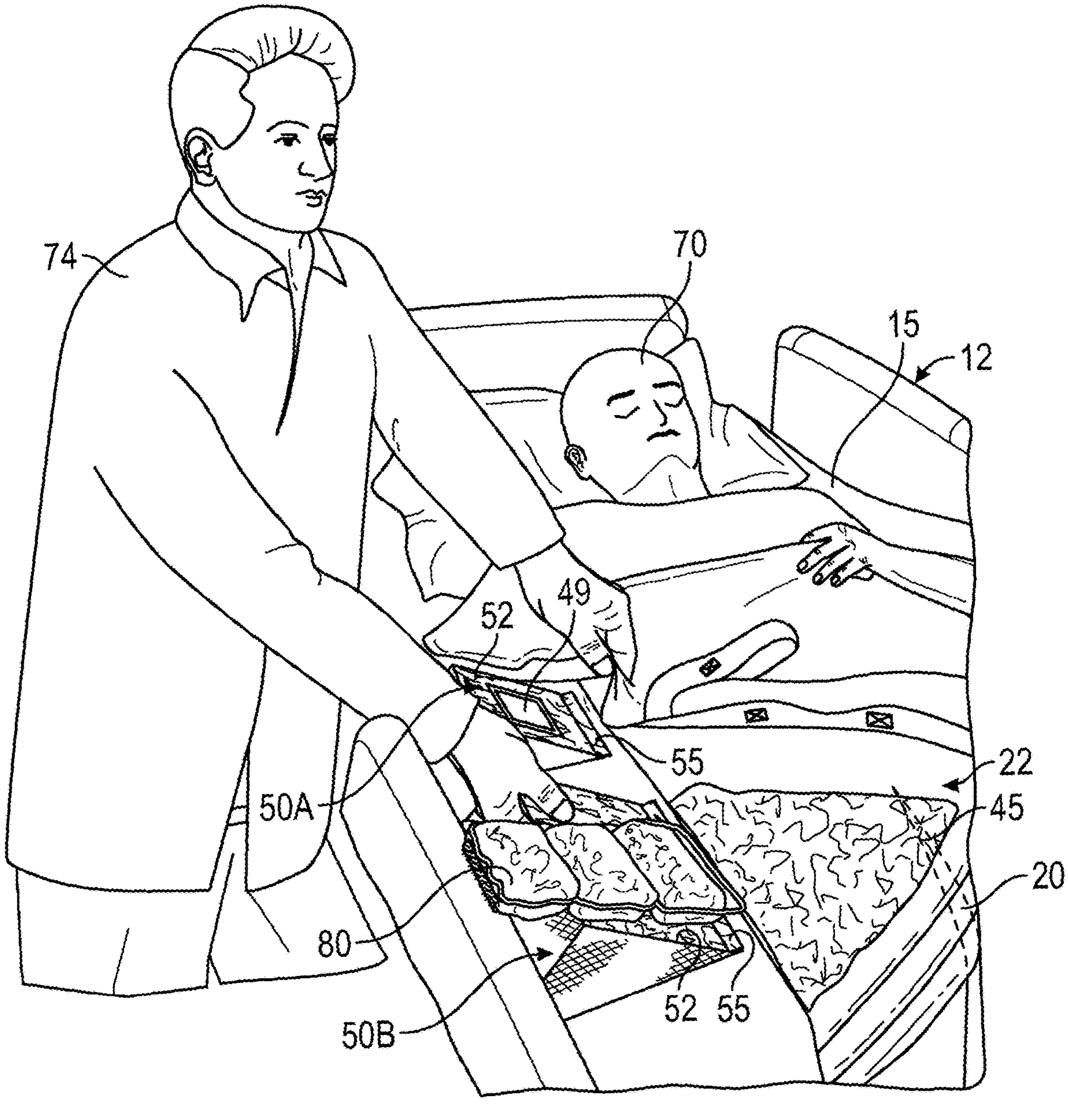
FIGS. 11*a-d* are a sequential series of views illustrating a method of turning a patient to an angled resting position utilizing the system of FIG. 1, according to aspects of the invention.
Figure 11B:
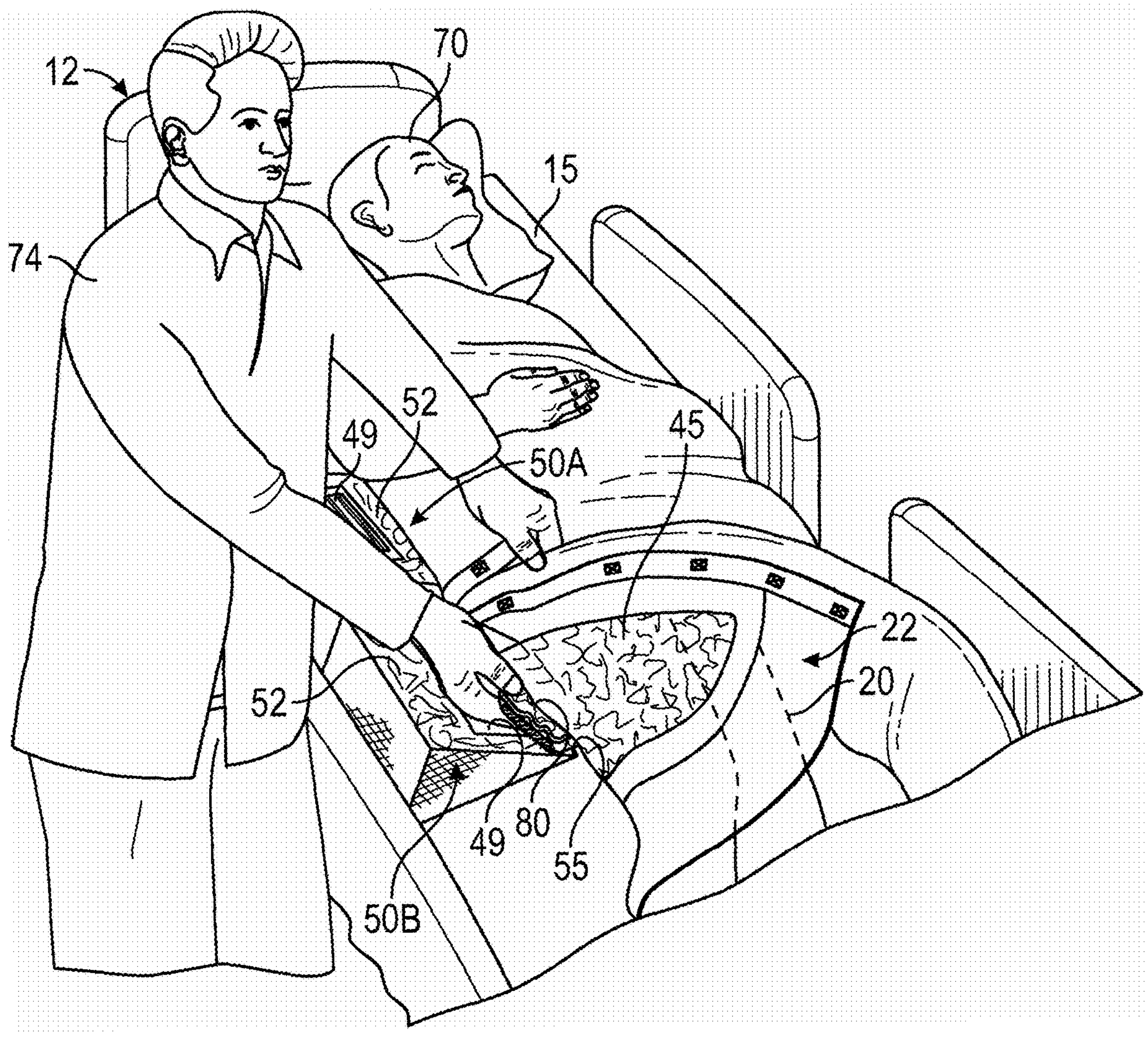

FIGS. 11*a-d* illustrate an example embodiment of a method for placing the patient in an angled resting position by placing two wedges 50A-B and the support 80 under the patient 70. The method is used with a patient 70 lying on a bed 12 as described above, having a bed sheet 15 (e.g., a fitted sheet) on the supporting surface 16, with the sheet 20 and pad 40 of the system 10 lying on top of the bed sheet 15 and the patient 70 lying on the pad 40. In this embodiment, the wedges 50A-B and the support 80 are positioned on top of the bed sheet 15, such that the bed sheet 15 contacts the base wall 51 of the wedge 50A-B and the bottom surface 84 of the support 80, and the ramp surface 52 of the wedge 50A-B and the top surface 83 of the support 80 contact the sheet 20. It is understood that no bed sheet 15 or other cover for the mattress 18 may be present in some embodiments, in which case the wedges 50 can be placed directly on the mattress 18. As shown in FIG. 11*a-b*, the edge of the sheet 20 is lifted, and the wedges 50A-B and the support 80 are inserted from the side of the bed 12 under the sheet 20 toward the patient 70. The support 80 may be inserted by the user 74 grasping the free end (opposite the connection 82), lifting the sheet 20 beneath the patient's thighs, and pushing the support into position, as shown in FIG. 11*b*. At this point, at least the apex 55 of each wedge 50A-B may be pushed toward, next to, or at least partially under the patient 70. The selective gliding assemblies 60 between the wedges 50A-B and the bottom surface 22 of the sheet 20 do not resist such insertion and allow free gliding of the wedge toward the patient and away from the side edge of the bed. This insertion technique may position the patient to the desired angle with no further movement of the patient 70 necessary. In one embodiment, the wedges 50A-B should be aligned so that the wedges are spaced apart with one wedge 50A positioned at the upper body of the patient 70 and the other wedge 50B positioned at the lower body of the patient 70, with the patient's sacral area positioned in the space between the wedges 50A-B. It has been shown that positioning the wedges 50A-B in this arrangement can result in lower pressure in the sacral area, which can reduce the occurrence of pressure ulcers in the patient 70. The wedges 50A-B may be positioned approximately 10 cm apart in one embodiment, or another suitable distance to provide space to float the sacrum, or in other words, to have minimal force on the sacrum. The support 80 is also pushed beneath the upper legs/thighs of the patient 70, downward of the sacral area, and the selective gliding assembly 60 between the support 80 and the bottom surface 22 of the sheet 20 does not resist such insertion.

Figure 11C:
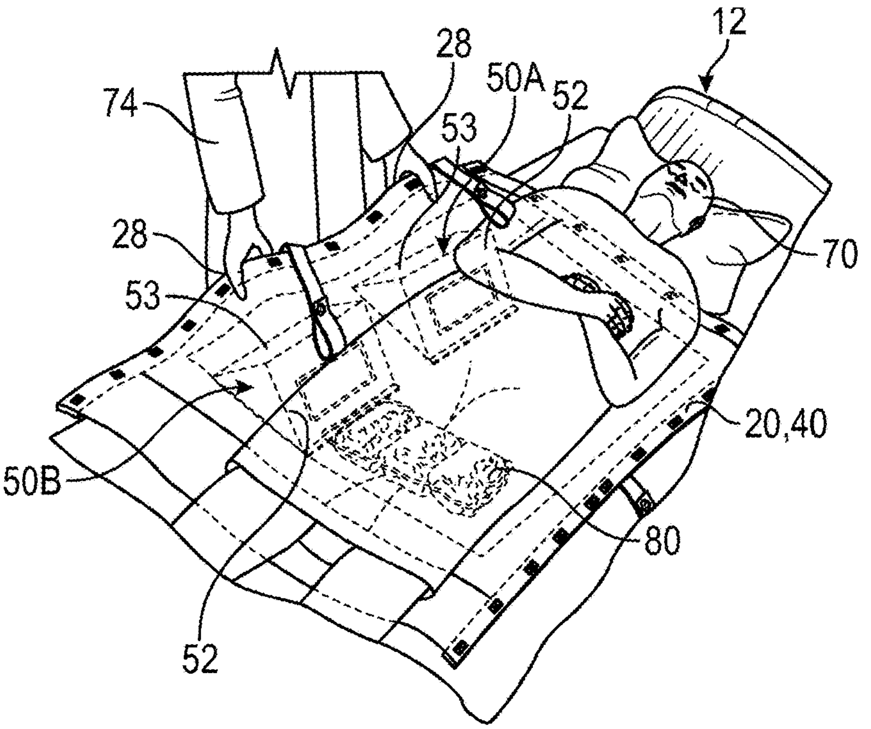
Figure 11D:
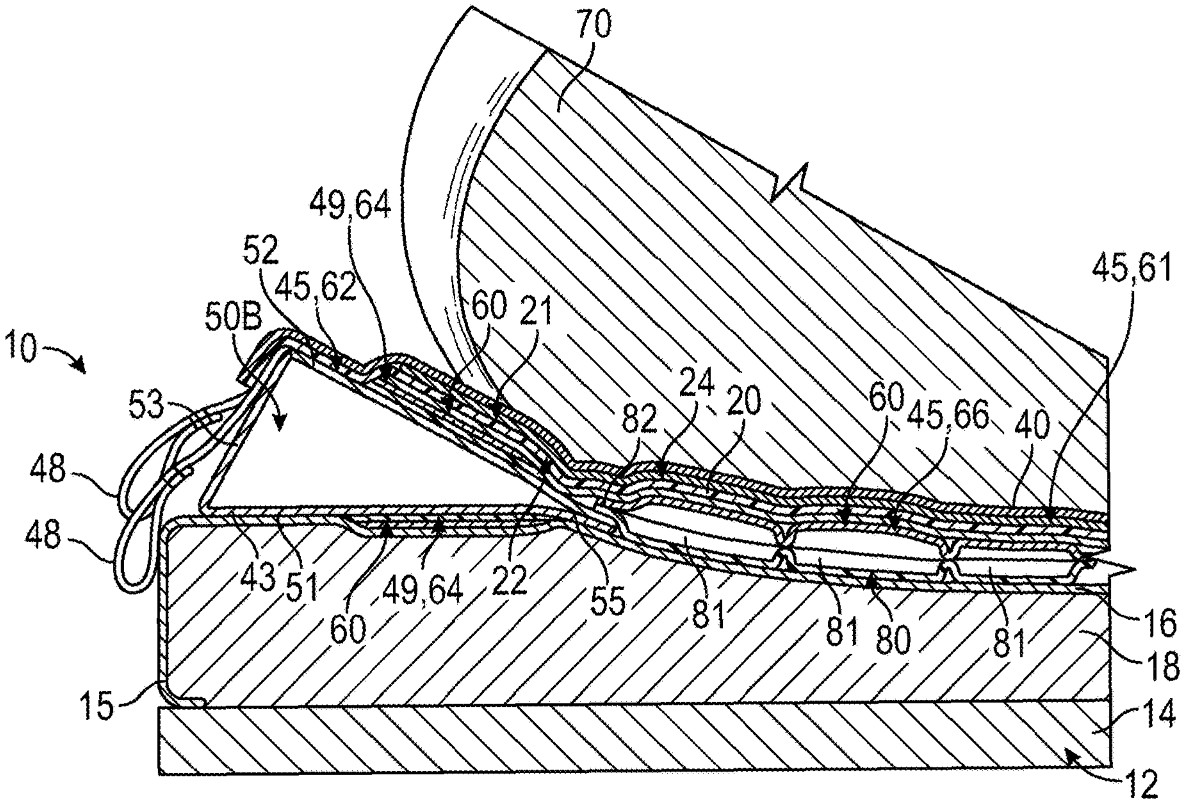

Once the wedges 50A-B and the support 80 have been inserted, the patient 70 may be in the proper angled position. If the patient 70 requires further turning to reach the desired angled position, the user 74 (such as a caregiver) can pull the patient 70 toward the wedges 50A-B and toward the user 74, such as by gripping the handles 28 on the sheet 20, as shown in FIG. 11*c*. This moves the proximate edge of the sheet 20 toward the back walls 53 of the wedges 50A-B and toward the user 74, and slides the patient 70 and at least a portion of the sheet 20 up the ramp surface 52, such that the ramp surface 52 partially supports the patient 70 to cause the patient 70 to lie in an angled position. During this pulling motion, the selective gliding assemblies 60 between the ramp surfaces 52 of the wedges 50A-B and the sheet 20 do not resist movement of the sheet 20, the engagement member 64 on the base wall 51 of the wedge 50A resists movement of the wedge 50A toward the user 74 (i.e., away from the patient 70 and toward the side edge of the bed 12), and the high friction surface 24 of the sheet 20 resists movement of the pad 40 and/or the patient 70 with respect to the sheet 20.

When the patient 70 is to be returned to lying on his/her back, the wedges 50A-B and the support 80 can be removed from under the patient 70. The sheet 20 may be pulled in the opposite direction in order to facilitate removal of the wedges 50A-B and support 80 and/or position the patient 70 closer to the center of the bed 12. The patient 70 can be turned in the opposite direction by inserting the wedges 50A-B and the support 80 under the opposite side of the bed sheet 15, from the opposite side of the bed 12, and pulling the sheet 20 in the opposite direction to move the patient 70 up the ramp surfaces 52 of the wedges 50A-B and the support 80, in the same manner described above.

Once the wedges 50A-B and the support 80 are positioned beneath the patient 70 and the sheet 70, the various selective gliding assemblies 60 resist undesirable movement of the patient 70 and the sheet 20. For example, the selective gliding assemblies 60 between the ramp surfaces 52 of the wedges 50A-B and the bottom surface 22 of the sheet 20 resist slipping of the sheet 20 down the ramp surfaces 52, and also resist slipping of the sheet 20 downward toward the foot 17 of the bed 12, and further resist slipping of the wedges 50A-B rearward away from the patient 70 and toward the side edge of the bed 12. As another example, the selective gliding assembly 60 on the base wall 51 of the wedge 50A resists slipping of the wedge 50A rearward away from the patient 70 and toward the side edge of the bed 12. As a further example, the selective gliding assembly 60 between the support 80 and the sheet 20 resists slipping of the sheet 20 downward (i.e., toward the foot 17 of the bed 12) with respect to the support 80. Still further, the support 80 may also provide support to the patient 70 to prevent slipping toward the foot 17 of the bed 12. These features in combination provide increased positional stability to the patient 70 as compared to existing turning and/or positioning systems, thereby reducing the frequency and degree of necessary repositioning. The patient 70, the pad 40, the sheet 20, and the wedges 50A-B tend to move "together" on the bed 12 in this configuration, so that these components are not unacceptably shifted in position relative to each other. This, in turn, assists in maintaining the patient 70 in optimal position for greater periods of time and reduces strain and workload for caregivers. To the extent that repositioning is necessary, the handles 28, 48 on the sheet 20 are configured to assist with such repositioning in a manner that reduces strain on caregivers.

As described above, in some embodiments, the wedges 50A-B may have an angle of up to approximately 45°, or from approximately 15-35°, or approximately 30°. Thus, when these embodiments of wedges 50A-B are used in connection with the method as shown in FIGS. 11*a-d*, the patient 70 need not be rotated or angled more than 45°, 35°, or 30°, depending on the wedge 50A-B configuration. The degree of rotation can be determined by the rotation or angle from the horizontal (supine) position of a line extending through the shoulders of the patient 70. Existing methods of turning and positioning patients to relieve sacral pressure often require rolling a patient to 90° or more to insert pillows or other supporting devices underneath. Rolling patients to these great angles can cause stress and destabilize some patients, particularly in patients with critical illnesses or injuries, and some critical patients cannot be rolled to such great angles, making turning of the patient difficult. Accordingly, the system 10 and method described above can have a positive effect on patient health and comfort. Additionally, the angled nature of the wedges 50A-B can allow for more accurate positioning of the patient 70 to a given resting angle, as compared to existing, imprecise techniques such as using pillows for support. Further, the selective gliding assemblies 60 resist undesired slipping with respect to the wedges 50A-B, which aids in maintaining the same turning angle.

The use of the system 10 and methods described above can decrease the number of pressure ulcers in patients significantly. The system 10 reduces pressure ulcers in a variety of manners, including reducing pressure on sensitive areas, reducing shearing and friction on the patient's skin, and managing heat and moisture at the patient's skin. The system 10 can reduce pressure on the patient's skin by facilitating frequent turning of the patient and providing consistent support for accurate resting angles for the patient upon turning. The system 10 can reduce friction and shearing on the patient's skin by resisting sliding of the patient along the bed 12, including resisting sliding of the patient downward after the head 13 of the bed 12 is inclined, as well as by permitting the patient to be moved by sliding the sheet 20 against the bed 12 instead of sliding the patient. The system 10 can provide effective heat and moisture management for the patient by the use of the absorbent body pad. The breathable properties of the sheet 20 and pad 40 are particularly beneficial when used in conjunction with an LAL bed system. Increased breathability also permits the system 10 to be placed underneath the patient 70 for extended periods of time. When used properly, pressure ulcers can be further reduced or eliminated.

The use of the system 10 and methods described above can also have beneficial effects for nurses or other caregivers who turn and position patients. Such caregivers frequently report injuries to the hands, wrists, shoulders, back, and other areas that are incurred due to the weight of patients they are moving. Use of the system 10, including the sheet 20 and the wedges 50A-B, can reduce the strain on caregivers when turning and positioning patients. For example, existing methods for turning and positioning a patient 70, such as methods including the use of a folded-up bed sheet for moving the patient 70, typically utilize lifting and rolling to move the patient 70, rather than sliding. Protocols for these existing techniques encourage lifting to move the patient and actively discourage sliding the patient, as sliding the patient using existing systems and apparatuses can cause friction and shearing on the patient's skin. The case of motion and reduction in shearing and friction forces on the patient 70 provided by the system 10 allows sliding of the patient 70, which greatly reduces stress and fatigue on caregivers.

As another example, the use of the pre-folded assembly 65 of the sheet 20 and pad 40 facilitates installation of the system 10, such as in FIGS. 10*a-d*, providing an advantage for caregivers. The interaction between the sheet 20 and pad 40, including the high friction material 24 of the sheet 20, as well as the simultaneous unfolding of the sheet 20 and pad 40, also help avoid wrinkles in the sheet 20 and/or the pad 40, which can cause pressure points that lead to pressure ulcers.

As another example, the use of the apparatus 10 and method as described above requires less effort for complete turning of the patient 70, as compared to other apparatuses and methods currently in existence. The act of pulling and sliding the sheet 20 and patient 70 toward the caregiver 74 to turn the patient 70 to an angled position, as shown in FIG. 11*c*, creates an ergonomically favorable position for movement, which does not put excessive stress on the caregiver 74. In particular, the caregiver 74 does not need to lift the patient 70 at all, and may turn the patient 70 simply by inserting the wedges 50A-B underneath the patient 70 and (if necessary) pulling on the handles 28 to allow the mechanical advantage of the ramp surface 52 to turn the patient 70. Additionally, it allows the patient 70 to be turned between the angled and non-angled positions (e.g.) 30°-0°-30° by only a single caregiver. Prior methods often require two or more caregivers. Still other benefits and advantages over existing technology are provided by the system 10 and methods described herein, and those skilled in the art will recognize such benefits and advantages.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. The terms "first," "second," "top," "bottom," etc., as used herein, are intended for illustrative purposes only and do not limit the embodiments in any way. Additionally, the term "plurality," as used herein, indicates any number greater than one, either disjunctively or conjunctively, as necessary, up to an infinite number. Further, "providing" an article or apparatus, as used herein, refers broadly to making the article available or accessible for future actions to be performed on the article, and does not connote that the party providing the article has manufactured, produced, or supplied the article or that the party providing the article has ownership or control of the article. Accordingly, while specific embodiments have been illustrated and described, numerous modifications come to mind without significantly departing from the spirit of the invention.

What is claimed is:

1. A method comprising:

placing a sheet above a support surface of a bed, the sheet having a bottom surface confronting the support surface, a top surface opposite the bottom surface, a head edge placed proximate to a head of the bed, and a foot edge placed proximate to a foot of the bed;

placing a patient on the sheet after the sheet is placed above the support surface; and inserting a wedge beneath the sheet and beneath the patient by moving the wedge away from a side edge of the bed and toward and beneath the patient, the wedge having a wedge body having a base wall, a ramp surface, and a back wall, the ramp surface joined to the base wall to form an apex, such that the base wall confronts the support surface and the ramp surface confronts the bottom surface and the patient, the ramp surface supporting the patient in an angled position after insertion of the wedge beneath the sheet and beneath the patient;

wherein the base wall has a base engagement member configured to engage a surface of the bed to form a selective gliding assembly that is configured to:

resist movement of the wedge with respect to the surface of the bed in a first direction away from the patient and toward the side edge of the bed, and facilitate movement of the wedge with respect to the surface of the bed in a second direction from the side edge toward the patient to ease insertion of the wedge beneath the sheet such that a first pull force necessary to create sliding movement of the wedge in the first direction is greater than a second pull force necessary to create sliding movement of the wedge in the second direction.

2. The method of claim 1, wherein:

the bottom surface has a sheet engagement member;

the ramp surface has a ramp engagement member; and the sheet engagement member and the ramp engagement member form a second selective gliding assembly that is configured to:

resist movement of the sheet with respect to the wedge in the second direction from the side edge toward the patient, and facilitate movement of the sheet with respect to the wedge in the first direction away from the patient and toward the side edge.

3. The method of claim 2, wherein a third pull force necessary to create sliding movement of the sheet in the second direction is greater than a fourth pull force necessary to create sliding movement of the sheet in the first direction.

4. The method of claim 3, wherein the second selective gliding assembly further resists movement of the sheet with respect to the wedge in a third direction parallel to the side edge of the bed, such that a fifth pull force necessary to create sliding movement of the wedge in the third direction is greater than the fourth pull force.

5. The method of claim 1, further comprising inserting a second wedge beneath the sheet and beneath the patient by moving the second wedge away from the side edge and toward and beneath the patient, the second wedge having a second wedge body having a second base wall, a second ramp surface, and a second back wall, the second ramp surface joined to the second base wall to form a second apex;

wherein the second ramp surface has a ramp engagement member.

6. The method of claim 1, wherein:

the wedge further comprises a support connected to the wedge and extending from the apex; and the method further comprises inserting the support beneath the sheet and beneath the patient in an upper thigh area of a patient, such that a bottom surface of the support confronts the support surface and a top surface of the support confronts the bottom surface of the sheet.

7. The method of claim 6, wherein the support is divided into a plurality of chambers, each of the chambers formed by stitched boundaries.

8. The method of claim 6, wherein:

the support comprises:

a first lateral edge adjacent to the apex, a second lateral edge opposite the first lateral edge, a third lateral edge, and a fourth lateral edge opposite the third lateral edge;

the wedge body comprises:

a first side wall extending between the base wall, the ramp surface, and the back wall, and a second side wall extending between the base wall, the ramp surface, the first side wall separated from the second side wall by a wedge width; and the third lateral edge is separated from the fourth lateral edge by a support width, the support width being less than the wedge width.

9. The method of claim 6, wherein the support is divided into a plurality of chambers, the chambers comprising:

a first chamber having a first length and a first width;

a second chamber having a second length and a second width, the second length equal to the first length, the second width equal to the first width; and a third chamber having a third length and a third width, the third length equal to the first length, the third width equal to the first width.

10. The method of claim 1, further comprising:

coupling a support to the apex of the wedge body; and inserting the support beneath the sheet and beneath the patient, such that a bottom surface of the support confronts the support surface and a top surface of the support confronts the bottom surface.

11. The method of claim 1, wherein the base engagement member covers only a first portion of the base wall such that edges of the base engagement member are spaced from edges of the base wall thereby exposing a second portion of the base wall.

12. The method of claim 11, wherein:

the apex is a first apex;

the ramp surface is joined to the back wall to form a second apex; and the base engagement member is located closer to the first apex in a third direction than to the second apex in a fourth direction, each of the third direction and the fourth direction being along the ramp surface.

13. The method of claim 1, wherein the ramp surface has a ramp engagement member, the ramp engagement member covering only a first portion of the ramp surface such that edges of the ramp engagement member are spaced from edges of the ramp surface thereby exposing a second portion of the ramp surface.

14. The method of claim 13, wherein the ramp engagement member is configured to engage the sheet, the ramp engagement member configured to resist movement of the sheet with respect to the ramp surface in the second direction, such that a third pull force necessary to create sliding movement of the sheet with respect to the ramp surface in the second direction is greater than a fourth pull force necessary to create sliding movement of the sheet with respect to the ramp surface in the first direction.

15. The method of claim 1, wherein the wedge comprises:

a first side wall extending between the base wall, the ramp surface, and the back wall, the first side wall disposed along a first plane; and a second side wall extending between the base wall, the ramp surface, and the back wall, the second side wall disposed along a second plane that is parallel to the first plane, the second side wall equal in size and shape to the second side wall.

16. The method of claim 1, wherein body is formed at least partially of compressible material.

17. The method of claim 1, wherein:

the sheet comprises a first piece of a first material having a first coefficient of friction and a second material connected to the first piece;

the second material having a second coefficient of friction;

the second material forms at least a portion of the top surface of the sheet;

the second coefficient of friction being higher than the first coefficient of friction, such that the top surface provides greater slipping resistance than the bottom surface in at least one direction.

18. The method of claim 17, wherein the second material comprises the first material and a coating applied to the first material.

19. The method of claim 1, wherein the ramp surface comprises:

a plurality of ramp surface edges;

a ramp surface first portion contiguous with each of the ramp surface edges, the ramp surface first portion having a first coefficient of friction; and a ramp surface second portion surrounded by the ramp surface first portion, the ramp surface second portion having a second coefficient of friction, the second coefficient of friction greater than the first coefficient of friction.

20. The method of claim 1, wherein:

the base wall comprises:

a plurality of base wall edges, a base wall first portion contiguous with each of the base wall edges, the base wall first portion having a first coefficient of friction, and a base wall second portion surrounded by the base wall first portion, the base wall second portion having a second coefficient of friction, the second coefficient of friction greater than the first coefficient of friction; and the base wall second portion is the base engagement member.

* * * * *